United States Patent
Kolati et al.

(10) Patent No.: US 12,041,686 B2
(45) Date of Patent: Jul. 16, 2024

(54) SYSTEM AND METHOD TO HANDLE MEDIA TRANSMISSION IN MISSION CRITICAL (MC) SYSTEM

(71) Applicant: Samsung Electronics Co., Ltd., Suwon-si (KR)

(72) Inventors: Naveen Kolati, Bangalore (IN); Vinayak Goyal, Bangalore (IN); Kiran Gurudev Kapale, Bangalore (IN); Siva Prasad Gundur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 17/515,207

(22) Filed: Oct. 29, 2021

(65) Prior Publication Data

US 2022/0053601 A1 Feb. 17, 2022

Related U.S. Application Data

(63) Continuation of application No. PCT/KR2021/010596, filed on Aug. 10, 2021.

(30) Foreign Application Priority Data

Aug. 10, 2020 (IN) .............................. 202041034311
Jul. 29, 2021 (IN) .............................. 202041034311

(51) Int. Cl.
*H04W 76/50* (2018.01)
*H04N 21/6332* (2011.01)
*H04W 76/38* (2018.01)

(52) U.S. Cl.
CPC ........ *H04W 76/50* (2018.02); *H04N 21/6332* (2013.01); *H04W 76/38* (2018.02)

(58) Field of Classification Search
CPC ... H04W 76/50; H04W 76/38; H04N 21/6332
(Continued)

(56) References Cited

U.S. PATENT DOCUMENTS

2006/0036879 A1  2/2006  Wahler et al.
2012/0324519 A1  12/2012  Laughlin
(Continued)

FOREIGN PATENT DOCUMENTS

| CN | 109756756 A | | 5/2019 | |
|----|-------------|---|--------|---|
| EP | 2363998 | * | 3/2010 | ............ H04L 29/06 |
| EP | 2363998 | * | 6/2021 | ............ H04L 29/06 |

OTHER PUBLICATIONS

3GPP TS 24.581 V14.7.0 (Sep. 2020), Technical Specification, 3rd Generation Partnership Project; Technical Specification Group Core Network and Terminals; Mission Critical Video (MCVideo) media plane control; Protocol specification (Release 14), Sep. 2020, 181 pages.

(Continued)

*Primary Examiner* — Maria El-Zoobi

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A system and a method to handle media transmission in the Mission Critical (MC) systems or MC Video system are provided. According to the system and the method, wastage of network resources can be avoided and other participants in the group can be given chance to transmit important data as maximum number of transmissions at a time in a group (Continued)

call are limited by network capacity. Accordingly, efficiency of the MC Video system can be improved.

15 Claims, 17 Drawing Sheets

(58) Field of Classification Search
USPC .................................................... 455/404.1
See application file for complete search history.

(56) References Cited

U.S. PATENT DOCUMENTS

| | | | |
|---|---|---|---|
| 2016/0182383 A1 | 6/2016 | Pedersen | |
| 2017/0048894 A1 | 2/2017 | Choi et al. | |
| 2019/0200176 A1 | 6/2019 | Gupta | |
| 2019/0273773 A1 | 9/2019 | Pattan et al. | |
| 2019/0334969 A1* | 10/2019 | Ge | H04L 65/764 |
| 2020/0037122 A1 | 1/2020 | Gupta et al. | |
| 2020/0068649 A1* | 2/2020 | Shah | H04W 76/50 |
| 2022/0038212 A1* | 2/2022 | Saloni | H04L 1/188 |
| 2022/0303325 A1* | 9/2022 | Kolati | H04L 1/1838 |

OTHER PUBLICATIONS

3GPP TS 24.581 V15.6.0 (Sep. 2020), Technical Specification, 3rd Generation Partnership Project; Technical Specification Group Core Network and Terminals; Mission Critical Video (MCVideo) media plane control; Protocol specification (Release 15), Sep. 2020, 208 pages.
3GPP TS 24.581 V16.6.0 (Sep. 2020), Technical Specification, 3rd Generation Partnership Project; Technical Specification Group Core Network and Terminals; Mission Critical Video (MCVideo) media plane control; Protocol specification (Release 16), Sep. 2020, 204 pages.
3GPP TS 24.581 V17.0.0 (Sep. 2020), Technical Specification, 3rd Generation Partnership Project; Technical Specification Group Core Network and Terminals; Mission Critical Video (MCVideo) media plane control; Protocol specification (Release 17), Sep. 2020, 206 pages.
Samsung, "Method to handle no active receiver in MCVideo System," C1-205484, 3GPP TSG-CT WG1 Meeting #125-e, Aug. 20-28, 2020, 28 pages.
Samsung, "Method to handle no active receiver in MCVideo System," C1-205485 was C1-205075, 3GPP TSG-CT WG1 Meeting #125-e, Aug. 20-28, 2020, 28 pages.
Samsung, "Method to handle no active receiver in MCVideo System," C1-205486 was C1-205076, 3GPP TSG-CT WG1 Meeting #125-e, Aug. 20-28, 2020, 27 pages.
International Search Report and Written Opinion of the International Searching Authority dated Nov. 8, 2021, in connection with International Application No. PCT/KR2021/010596, 7 pages.
3GPP TS 24.581 V16.5.0 (Jun. 2020), Technical Specification, 3rd Generation Partnership Project; Technical Specification Group Core Network and Terminals; Mission Critical Video (MCVideo) media plane control; Protocol specification (Release 16), Jun. 2020, 201 pages.
Supplementary European Search Report dated Aug. 10, 2023, in connection with European Patent Application No. 21856201.5, 10 pages.
Hearing Notice issued Mar. 11, 2024, in connection with Indian Patent Application No. 202041034311, 2 pages.

* cited by examiner ated communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SYSTEM AND METHOD TO HANDLE MEDIA TRANSMISSION IN MISSION CRITICAL (MC) SYSTEM

CROSS-REFERENCE TO RELATED APPLICATIONS

This application is a continuation of International Application No. PCT/KR2021/010596, filed Aug. 10, 2021, which claims priority to Indian Patent Application No. 202041034311, filed Aug. 10, 2020, and Indian Patent Application No. 202041034311, filed on Jul. 29, 2021, the disclosures of which are herein incorporated by reference in their entirety.

BACKGROUND

1. Field

The disclosure relates to telecom networks, and more specifically to Mission Critical (MC) systems offered over telecom networks. More particularly it is related to a system and method to handle media transmission in the Mission Critical (MC) systems or MC Video system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In line with the development of communication systems, there is a need for a method of handling media transmission in Mission Critical (MC) systems or an MC Video system.

SUMMARY

In MC systems or a Mission Critical Video (MCVideo) system, the transmission control server state machine for 'general reception control operation' as described in 3GPP TS 24.581 sub clause 6.3.6, the transmission control server state machine for 'general transmission control operation "as described in 3GPP TS 24.581 sub clause 6.3.4 and the transmission control server state machine for 'basic transmission control operation towards the transmission participant' as described in 3GPP TS 24.581 sub clause 6.3.5 do not define any procedure to terminate the transmitter's stream when all MCVideo receivers terminate reception of that stream or when all MCVideo receivers do not accept reception notification even after providing sufficient time to accept or reject the notification. Thus, there is no procedure defined to terminate transmitting a stream when no user is interested in receiving that particular stream. Furthermore, the conventional system also does not provide any reason for the termination of the transmission. Thus, if another user wants to transmit an important communication then that opportunity has not been provided.

Accordingly, it is desired to address the above-mentioned disadvantages or other shortcomings or at least provide a useful alternative.

In Mission Critical Video (MCVideo) systems, when an MCVideo user in a group is granted the permission to send media, all MCVideo users who are part of that group will get a media transmission notification message from an MCVideo server. Based on a user's interest or priorities, the user can accept, reject, or ignore the notification. If, within a given time, none of the users in the group accept the notification, or if initially some users accepted but later all of those users terminated reception by sending a reception end request to the server, then the transmitting user's stream should be terminated and the transmitting user should be informed about the reason for the termination. 3GPP TS 24.581 currently does not define any procedure or method to terminate a stream and inform the transmitter when there are no active receivers for that stream.

In the present disclosure, a procedure to address the above problem is provided. In the present disclosure, a new timer and a new counter in an MCVideo server are disclosed. The new timer will be started when none of the MCVideo users are receiving the stream even though it is currently being transmitted by another MCVideo user. The new timer will be stopped when at least one user is granted permission to receive the stream. The new counter is used to track a count of active receiving users for the stream. When there are no active receivers for the stream, the MCVideo server can use a transmission end request or a transmission revoke message to terminate the stream and to inform the transmitter about the reason for termination.

According to one embodiment of the disclosure, a method to handle media transmission in mission critical (MC) systems is provided. The method comprises receiving, by an MC server, a request from a first sender for transmitting a media stream to at least one receiver. Thereafter, sending, by the MC server, a notification to the at least one receiver to receive the media stream transmitted by the first sender. The MC server initiates a timer with a predefined time duration after sending the notification. The MC server then determines that the notification to receive the media stream is rejected or not accepted by the at least one receiver within the predefined time duration of the timer, and then the MC server sends a transmission end request to the first sender to terminate the request for media stream transmission based on one of the rejection or non-acceptance of the reception of the media stream.

According to yet another embodiment of the disclosure, a method to handle media transmission in mission critical (MC) systems at an MC device is provided. The method comprises receiving, by the MC device, a transmission end request from an MC server for terminating a media stream transmission. Thereafter, notifying, by the MC device, a user associated with the MC device of a reason for termination of the media stream transmission, wherein the reason for ending the transmission is an absence of at least one receiver device for receiving the media stream. The method further includes sending, by the MC device, a transmission end response to the MC server and terminating transmission of the media stream to the MC server.

According to another embodiment of the disclosure, a method to handle media transmission in mission critical (MC) systems at a transmission participant device is provided. The method comprises receiving, by a transmission participant device, a Transmission End Request from a Transmission Control Server. The method further comprises notifying, by the transmission participant device, a user associated with the transmission participant device of a media stream termination reason indicating that the client's permission to send media is being revoked as the result of an absence of at least one participant device to receive the media stream. The method further comprises sending, by the transmission participant device, a Transmission End Response to the Transmission Control Server and terminating the sending of the media stream to the Transmission Control Server.

According to a further embodiment of the disclosure, a method to handle media transmission in mission critical (MC) at the Transmission Control Server is provided. The method comprises sending, by the transmission control server, a Transmission End Request message to the transmitting MC device for terminating a transmission of a media stream when a timer (T11) that is defined as a Stream Reception Idle T11 timer expires. The method further comprises, receiving, by the transmission control server, a Transmission End Response from the transmitting transmission participant device. The transmission control server then sends a Transmit End Notify message to at least one media receiving client, wherein the Transmit End Notify message indicates an end of transmission from the transmission participant device.

According to yet another embodiment of the disclosure, a method to handle media transmission in mission critical (MC) at the Transmission Control Server is provided. The method comprises granting, by the transmission control server, permission to a first transmission participant device to transmit a media stream to a plurality of MC devices, then sending a "Media Transmission Notify" message to at least one MC device to receive the media stream transmitted by the first transmission participant device. The method further comprises receiving, by the transmission control server, a "Receive Media Request" message from the at least one MC device to receive media stream from the first transmission participant device. After that, the transmission control server sends a "Receive Media Response (Granted)" message to the at least one MC device to indicate a grant of permission to receive the media stream from the first transmission participant device. The transmission control server then receives a "Media Reception End Request" message to terminate the reception from the at least one MC device and then sends a "Media Reception End Response" to indicate the termination response of the media stream reception. The transmission control server then determines that at least one MC device is not receiving the media stream based on expiry of a predefined time duration of the timer T11 (Stream Reception Idle) and then enters a "Reception Idle" state based on a Counter (C11) value that is defined as a count of active receivers for the media stream.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In the disclosure, a system and a method to handle media transmission in Mission Critical (MC) systems or an MC Video system are provided. According to the system and the method, wastage of network resources can be avoided and other participants in a group can be given chance to transmit important data as the maximum number of transmissions at a time in a group call are limited by network capacity. Accordingly, efficiency of the MC Video system can be improved.

BRIEF DESCRIPTION OF THE DRAWINGS

The disclosure is illustrated in the accompanying drawings, throughout which like reference letters indicate corresponding parts in the various figures. The embodiments herein will be better understood from the following description with reference to the drawings, in which.

Figure 1A:
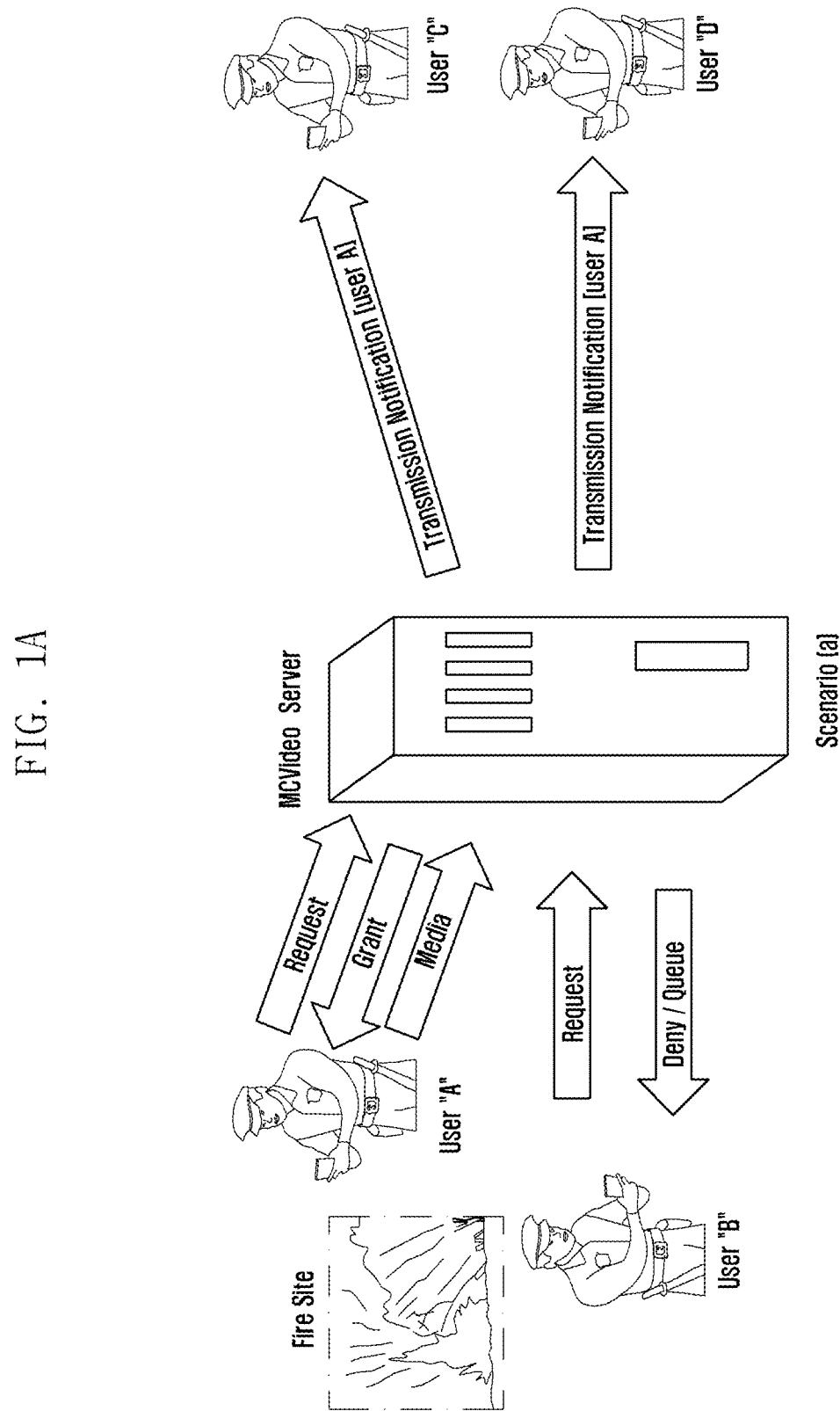
FIG. 1A illustrates an exemplary scenario (a) according to embodiments of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices, sub-systems, elements, structures, or components proceeded by "comprises . . . a" does not, without more constraints, preclude the existence of other devices, other sub-systems, other elements, other structures, other components, additional devices, additional sub-systems, additional elements, additional structures, or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

In Mission Critical Video (MCVideo) systems, when an MCVideo user in a group is granted permission to send media, all MCVideo users who are part of that group will get a media transmission notification message from an MCVideo server. Based on a user's interest or priorities, the user can accept, reject, or ignore the notification. If, within a given time, none of the users in the group accept the notification, or if initially some users accepted but later all of those users terminated reception by sending a reception end request to the server, then the transmitter's stream should be terminated and the transmitting user should be informed about the reason for the termination. This is done mainly to avoid wastage of resources and to give other users a chance to transmit important data. 3GPP TS 24.581 currently does not define any procedure or method to terminate a stream and inform the transmitter when there are no active receivers for that stream. An exemplary scenario is shown in FIGS. 1A and 1B to elaborate on the issues that may be occur due to such conditions.

FIG. 1A illustrates an exemplary scenario (a) according to embodiments of the present disclosure. According to scenario (a), User A has requested to send media. An MCvideo server has sent a Grant to User A, and a Transmission Notification to Users C & D. No other member in the group is transmitting media at this time. Users C & D did not accept the Transmission Notification. User A is then transmitting media but none of the other users are receiving it. Subsequently, User B requested to send media, but because User A's transmission is still active, User B's request is either denied or queued.

Figure 1B:
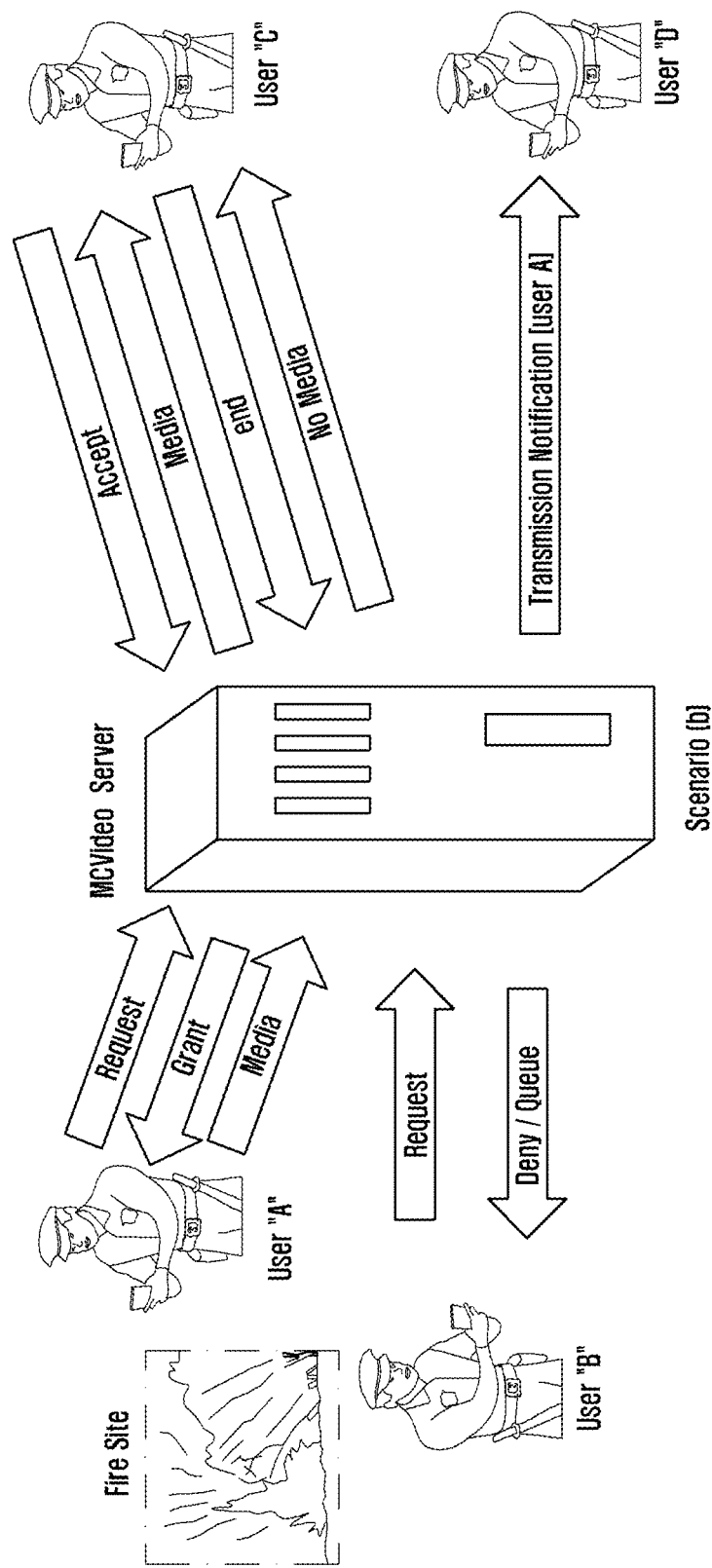
FIG. 1B illustrates an exemplary scenario (b), according to embodiments of the present disclosure.

FIG. 1B shows an exemplary scenario (b) according to embodiments of the present disclosure. According to scenario (b), User A has requested to send media. The MCvideo server has sent a Grant to User A, and a Transmission Notification to Users C & D. No other member in the group is transmitting at this time. User C accepted the Transmission Notification but User D rejected or ignored the Transmission Notification. After some time, User C ends reception even though User A is still transmitting. At this point, User A is transmitting media but none of the other users are receiving it. Subsequently, User B requests to send media, but because User A's transmission is still active, User B's request is either denied or queued.

According to the above-disclosed scenarios, even if no receiver (e.g., Users C or D) has accepted the transmission notification request, sender A keeps on sending the transmission. This creates an unnecessary waste of resources. It further it also prohibits or disallows another user B from initiating a media transmission. Furthermore, Mission Critical systems have limitations on the number of maximum simultaneous transmissions in a particular group call. Some participants having a critical disaster video stream to transmit might be blocked or delayed from transmitting the information to the decision making control rooms in real-time, causing damage to life saving efforts. Such a situation may not be good in a mission critical environment.

According to the an embodiment of the present disclosure, a unique procedure to address the above problems is provided. In particular, a new timer T11 and a new counter C11 at the MCVideo server are defined for use in cases where none of the Mission Critical users in the group are receiving a particular stream due to other priorities.

The new timer T11 may be started when none of the MCVideo users are receiving the stream even though it is currently being transmitted from another MCVideo user. Upon expiry of the timer T11, the MCVideo server will initiate a "Transmission TM End Request" with a rejection reason to the transmitting device/client to terminate transmission of the stream, and other users in the queue are granted permission to transmit media. The new timer T11 may be stopped when at least one user is granted permission to receive the stream. Further, the new counter C11 is used to track an active receiving user count for that stream. When there are no active receivers for the stream, the MCVideo Server may use a transmission end request or a transmission revoke message to terminate the media stream and to inform the transmitter about the reason for the termination.

Figure 2:
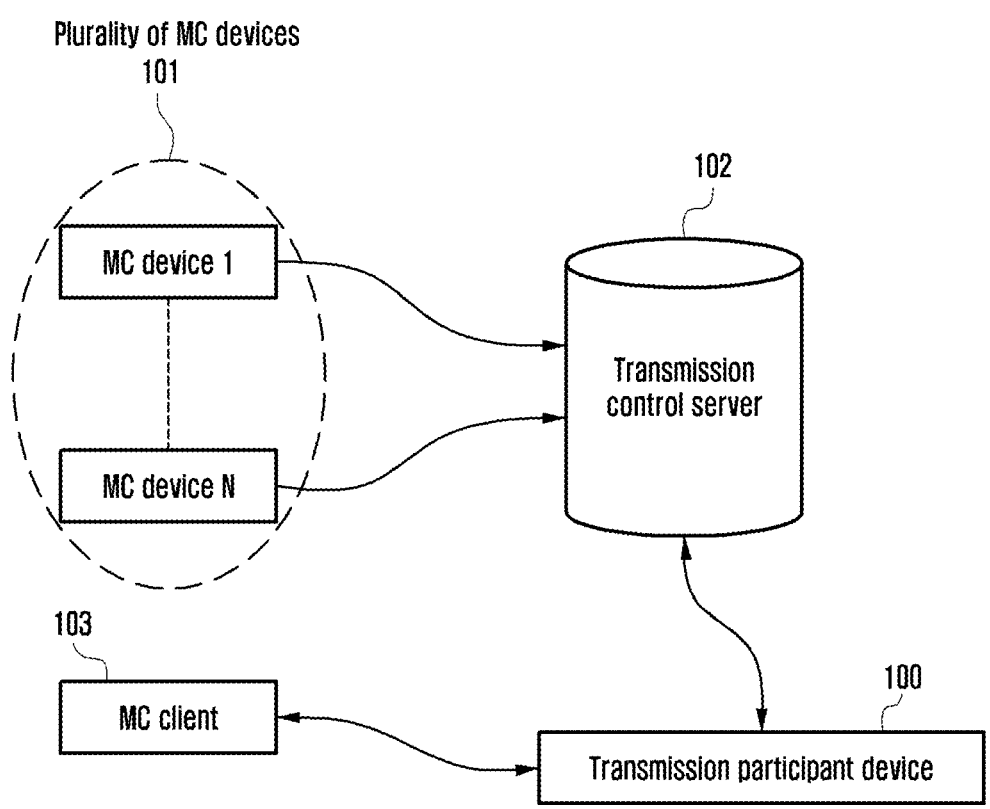
FIG. 2 illustrates an example architecture of a mission critical (MC) system for handling media transmission, according to embodiments of the present disclosure.

FIG. 2 illustrates an example architecture of a mission critical (MC) system for handling media transmissions according to embodiments of the present disclosure. According to FIG. 2, the MC system 200 may include one or more MC devices (MC device 1, MC device 2 ... MC device N). For convenience, the MC devices may be referred as MC device 101 throughout the disclosure. Further, the MC device 101 may be alternately referred as receiver or sender without deviating from the scope of the disclosure. The MC device 101 is in communication with a transmission control server 102. The transmission control server 102 may be alternatively referred as server, MC server, or MCVideo server without deviating from the scope of the disclosure. The transmission control server 102 is commutatively coupled with a transmission participant device 100. The transmission participant device 100 may further communicate with an MC client 103. The transmission participant device 100 and the MC client 103 may be alternatively referred as receivers or MC devices without deviating from the scope of the disclosure.

According to FIG. 2, an MC Group call session may be established between MC devices 100, 101 and transmission control server 102. A plurality of transmission participant devices 100 may send transmission requests to the transmission control server 102 to send media. The media may be referred as a media stream without deviating from the scope of the disclosure. The transmission control server 102 may grant permission to transmission participant device 100 and send a "Media Transmission Notify" message to other MC devices 101 to receive media transmission. Based on responses from the MC devices 101, the media may be transmitted only to granted MC devices 101. A timer T11 and a counter C11 may be implemented at the transmission control server 102 for handling various scenarios as explained, but not limited to, in FIG. 1A and FIG. 1B.

Figure 3:
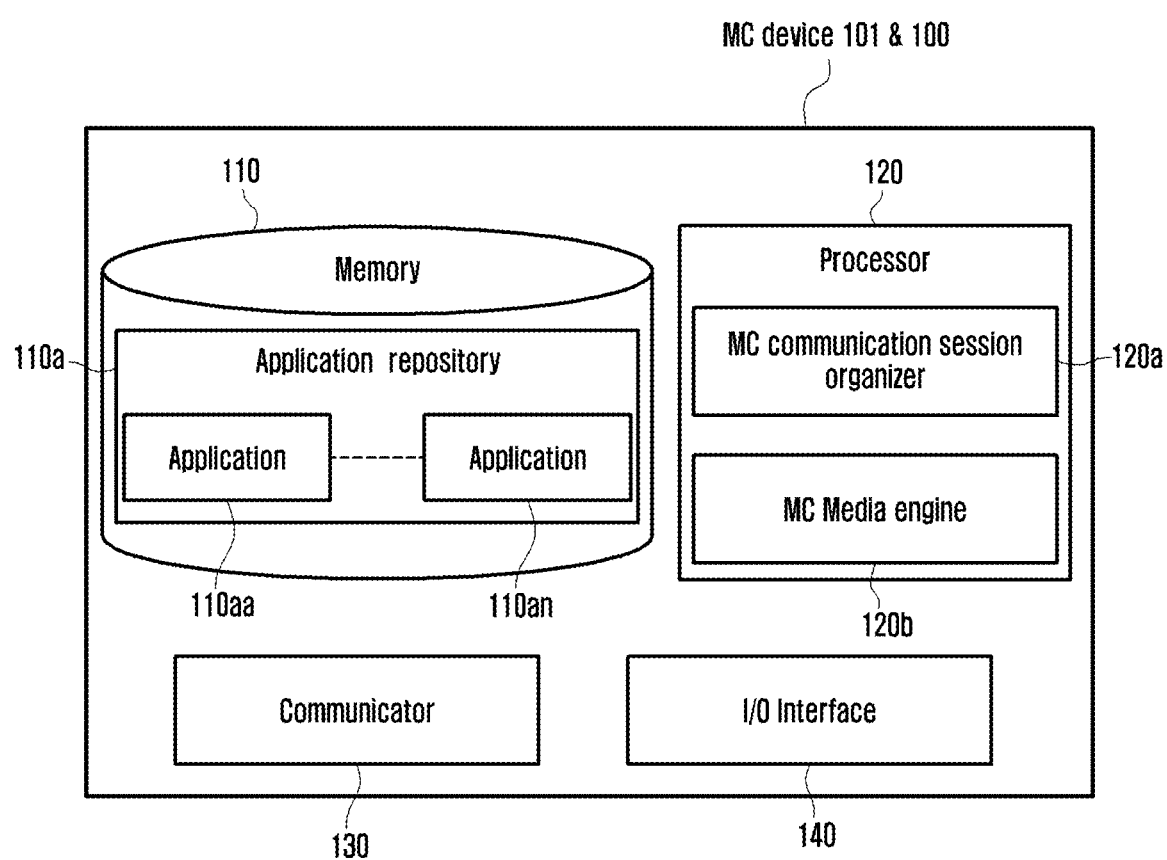
FIG. 3 illustrates a block diagram of a MC device for handling media transmission, according to embodiments of the present disclosure.

FIG. 3 illustrates a block diagram of an MC device for handling media transmissions according to embodiments of the present disclosure. The MC device 101 may be a computing device including, but not limited to, a smartphone, a tablet, a smart glass, a smart webcam, a desktop computer, a notebook, a relay device, a D2D device, a V2X device, or any other computing device. The transmission participant device 100 may also be referred as the MC device 101 and may be associated with the same group. Referring to FIG. 3, an MC device 101 of embodiments of the present disclosure may include a memory 110, a processor 120, a communicator 130, and I/O interface 140. The memory 110 may include an application repository 110a. The application repository 110a may include application(s) 110aa to 110an. The processor 120 may include an MC communication session organizer 120a and an MC media engine 120b.

Figure 4:
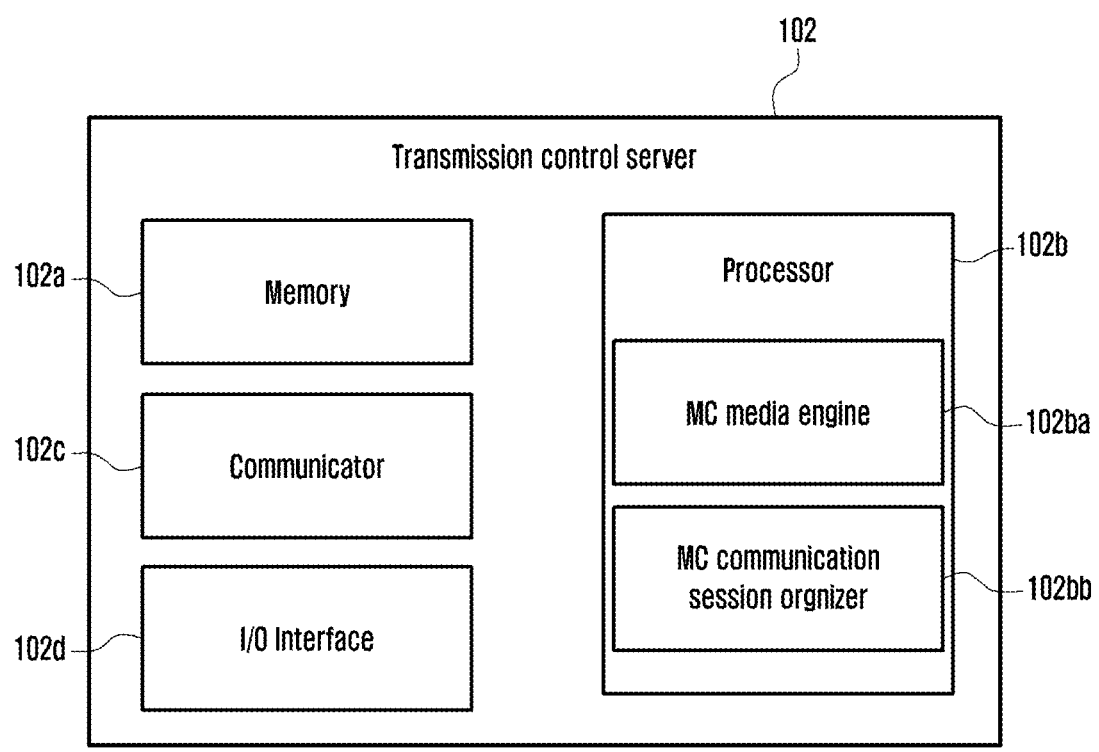
FIG. 4 illustrates a block diagram of a Transmission Control Server for handling media transmission according to embodiments of the present disclosure.

FIG. 4 illustrates a block diagram of a transmission control server for handling media transmissions according to embodiments of the present disclosure. The transmission control server 102 may include a variety of network devices, including routers, bridges, servers, computing devices, storage devices, etc. The participating and controlling MCVideo function may both be referred to the transmission control server 102. Referring to FIG. 4, a transmission control server 102 in an embodiment of the disclosure may include a memory 102a, a processor 102b, a communicator 102c, and an I/O interface 102d. The processor 102b may include an MC media engine 102ba and an MC communication session organizer 102bb.

Figure 5:
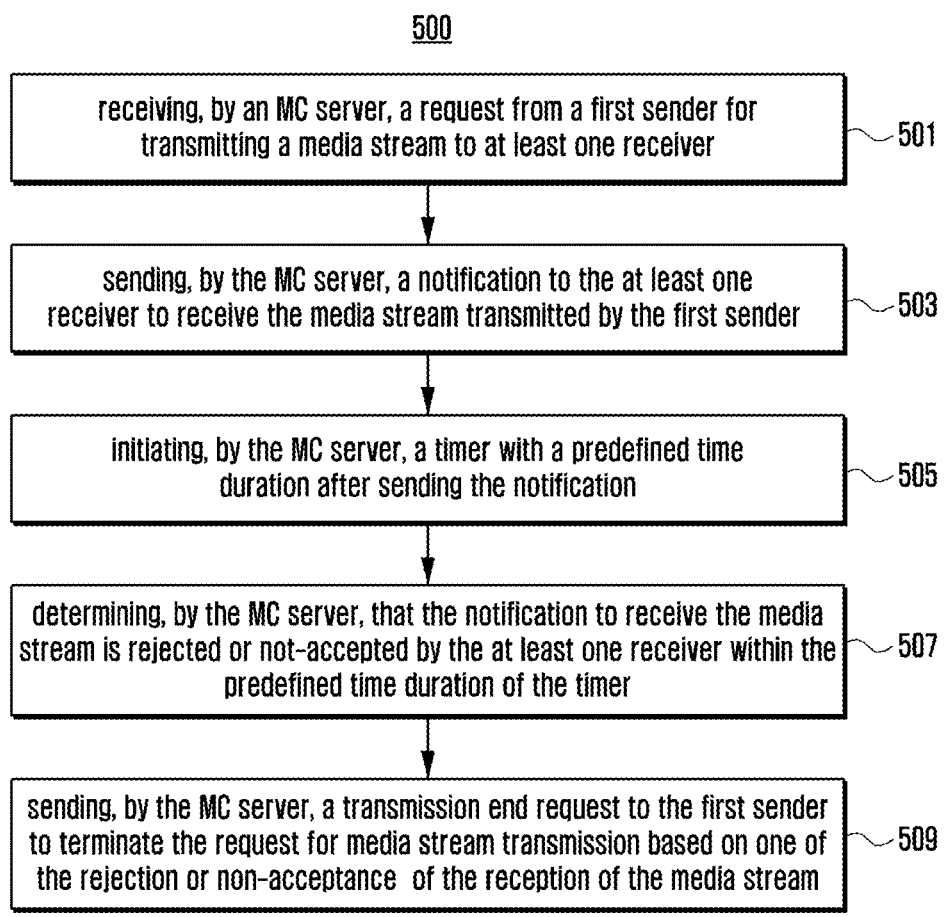
FIG. 5 illustrates a flow diagram for handling media transmission in the MC system according to embodiments of the present disclosure.

FIG. 5 illustrates a flow diagram for handling media transmissions in the MC system according to embodiments of the present disclosure. Referring to FIG. 5, a method 500 may be implemented in the MC server 102 of the MC system as shown in FIG. 2. Explanation will be made herein with respect to FIGS. 2 to 4 combined. In one implementation, the MC server 102 may perform the method 500.

According to FIG. 5, at step 501, initially the method 500 includes receiving, by the MC server 102, a request from a first sender for transmitting a media stream to at least one receiver. In an embodiment, the first sender may be one of the transmission participant devices 100 and the receiver may be one of the MC devices 101. In another embodiment, the first sender and the at least one receiver belong to a same group of MC devices 101, and the media stream may include, but is not limited to, at least one of video or audio data.

Thereafter, at step 503, the MC server 102 may be configured to send a notification to the at least one receiver to receive the media stream transmitted by the first sender. The notification may be a type of message including, but not limited to, audio, video, text, multimedia, or user interface elements.

Thereafter, at step 505, the MC server 102 may be configured to initiate a timer with a predefined time duration after sending the notification. The timer may be a timer T11 defined as a Stream Reception Idle timer, which is associated with the media stream being idle. Furthermore, the time duration may be set according to a criticality of the MC system.

Thereafter, at step 507, the MC server 102 may be configured to determine whether the notification to receive the media stream is rejected or not accepted by the at least one receiver within the predefined time duration of the timer. For example, the notification to receive the media stream may be rejected due to a prioritized task, or the receiver may be unaware of the notification and thereby not accept the notification.

At step 509, the MC server 102 may be configured to send a transmission end request to the first sender to terminate the request for media stream transmission based on one of the rejection or non-acceptance of the reception of the media stream.

Referring again to step 505, after sending the notification to the at least one receiver, the MC server 102 may be configured to check for an acceptance of the transmitted media by the at least one receiver. Based on the rejection or non-acceptance of the reception of the media stream by the at least one receiver, the MC server 102 may be configured to terminate transmission of the media stream from the first sender device.

In a further implementation of the method 500, the MC server 102 may be configured to receive a transmission end response from the first sender in response to sending the transmission end request. The transmission end request may include a reason for ending the transmission. In an embodiment, the reason for ending the transmission is due to the absence of at least one receiver for receiving the media stream.

In yet another implementation of the method 500, the MC server 102 may be configured to grant a second sender to transmit a new media stream to the at least one receiver after sending the transmission end request to the first sender.

In a further implementation of the method 500, the MC server 102 may be configured to accept the notification to receive the media stream. The accepting of the notification to receive the media stream may include receiving, by the MC server 102, a request to receive the media stream from at least one receiver. For example, when the notification is being accepted by the at least one receiver, the receiver in response sends a request to the MC server for receiving the media stream.

After the above step, the MC server 102 may be configured to send a response to the at least one receiver to inform the receiver about reception grant permission. Thereafter, the MC server 102 may be configured to increment a counter value by one for each active receiver from the at least one receiver based on the reception of the grant permission. For example, the counter C11 defined above may be used to track a count of active receivers for the stream.

After the above step of accepting the notification to receive the media stream, the MC server 102 may receive a request to terminate the media stream reception from the at least one receiver. Thereafter, the MC server 102 may be configured to send a response to indicate the termination of the media stream reception. Further to this, the MC server 102 may be configured to decrement the counter value by one for each termination of the media stream reception by one of the at least one receivers. The MC server 102 enters into a "reception idle" state if the counter value reaches a lower limit. Thereafter, the MC server 102 determines that none of the at least one receivers is receiving the media stream if the timer expires. After the timer expiry, the MC server 102 may be configured to send a transmission end request to the first sender to terminate the transmission.

In a further implementation of the method 500, the MC server 102 may be configured to re-initiate the timer with the predefined time duration when the counter value reaches a minimum predefined value after decrementation of the counter value, or at a time at which the MC server 102 sends a "Media Transmission Notify" message to the MC device 102.

In a further implementation of the method 500, the MC server 102 may be configured to terminate the timer if the at least one receiver accepts the notification to receive the media, or if the media transmission is ended by the transmission control server 102 by sending a transmission end notify message.

Figure 6:
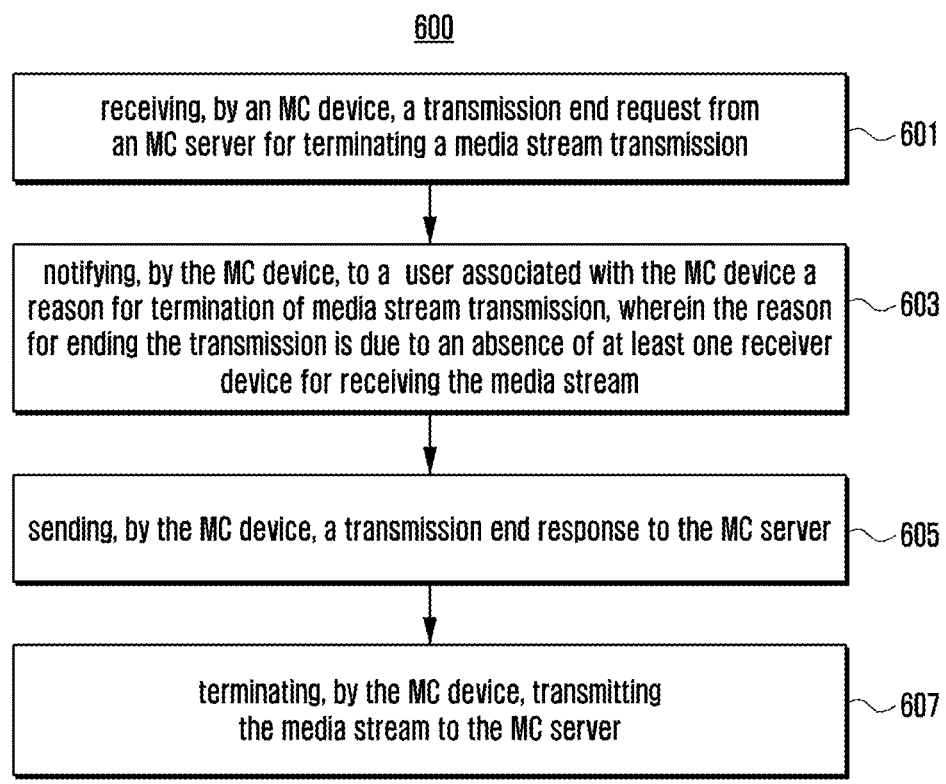
FIG. 6 illustrates a flow diagram for handling media transmission in the MC device according to embodiments of the present disclosure.

FIG. 6 illustrates a flow diagram for handling media transmissions in the MC device 101 according to embodiments of the present disclosure. Referring to FIG. 6, a method 600 may be implemented in the MC device 101 of the MC system 200 as shown in FIG. 2. Explanation will be made herein with respect to FIGS. 2 to 5 combined. In one implementation, the MC device 101 may perform the method 600.

According to FIG. 6, at step 601, the method 600 includes receiving, by an MC device 101, a transmission end request from an MC server 102 for terminating a media stream transmission, further to step 509 as explained in FIG. 5.

Thereafter, at step 603, the method 600 includes notifying, by the MC device 101, a user associated with the MC device 101 of a reason for termination of the media stream transmission. In one embodiment, the reason for ending the transmission is due to an absence of at least one receiver device for receiving the media stream. Thus, the user who may be holding the MC device 101 is notified about the ending of the transmission along with a reason for the termination.

Subsequent to the step 603, at step 605, the MC device 101 may be configured to send a transmission end response to the MC server 102, and thereafter at step 607 the MC device 101 may be configured to terminate transmission of the media stream to the MC server 102.

Figure 7:
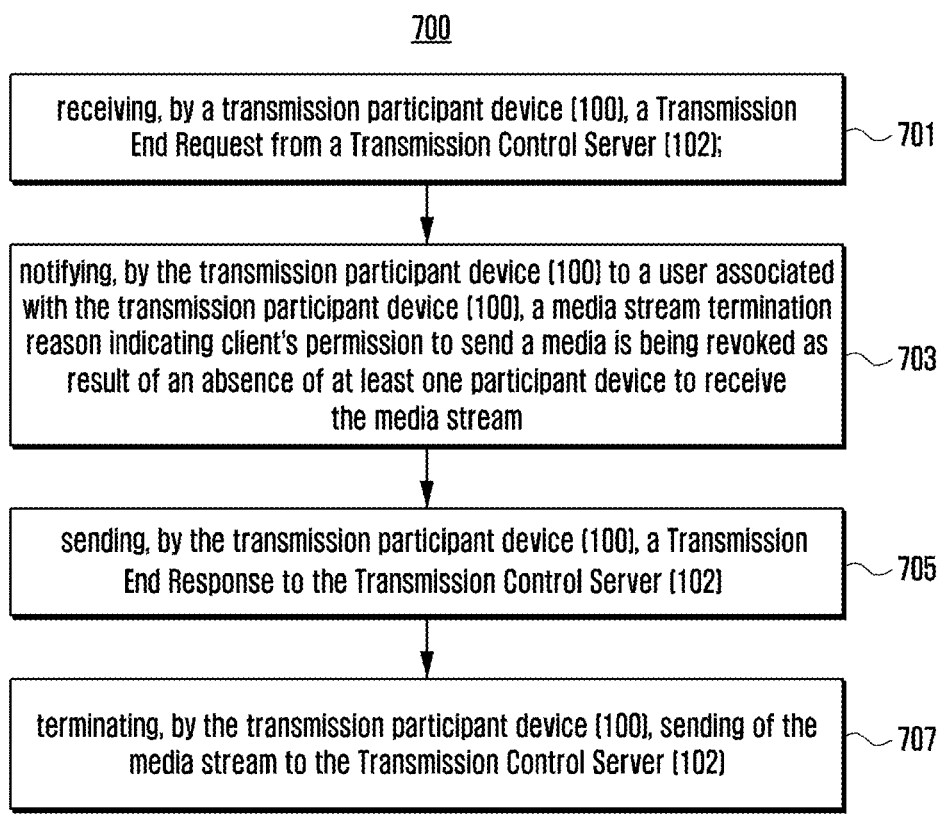
FIG. 7 illustrates a flow diagram for handling media transmission in the transmission participant device according to embodiments of the present disclosure.

FIG. 7 illustrates a flow diagram for handling media transmissions in the transmission participant device according to embodiments of the present disclosure. Referring to FIG. 7, a method 700 may be implemented in the transmission participant device 100 of the MC system 200 as shown in FIG. 2. Explanation will be made herein with respect to FIGS. 2-6 combined. In one implementation, the transmission participant device 100 may perform the method 700.

According to FIG. 7, at step 701, the method 700 includes receiving, by a transmission participant device 100, a Transmission End Request from a transmission control server 102, further to step 509 as explained in FIG. 5.

Thereafter, at step 703, the transmission participant device 100 may be configured to notify a user associated with the transmission participant device 100 of a media stream termination reason. The media stream termination reason indicates that the client's permission to send the media stream is being revoked due to an absence of at least one other transmission participant device 100 to receive the media stream.

Subsequently, at step 705, the transmission participant device 100 may be configured to send a Transmission End Response to the transmission control server 102.

Thereafter, at step 707, the transmission participant device 100 may be configured to terminate sending the media stream to the transmission control server 102.

According to FIG. 7, the transmission participant device 100 may be configured to enter into a "Call Releasing" state for a broadcast group call, or a "Has no permission to transmit" state for a normal or a non-broadcast group call. For example, if the call initiated as a broadcast group call, then after sending the end response message, i.e., after step 705, the transmission participant device 100 will enter the Call Releasing state. For any other type of calls after step 705, the transmission participant device 100 may enter the "Has no permission" state. In some embodiments, the transmission participant device 100 may be the MC device 101 and may be associated with a same group.

Figure 8:
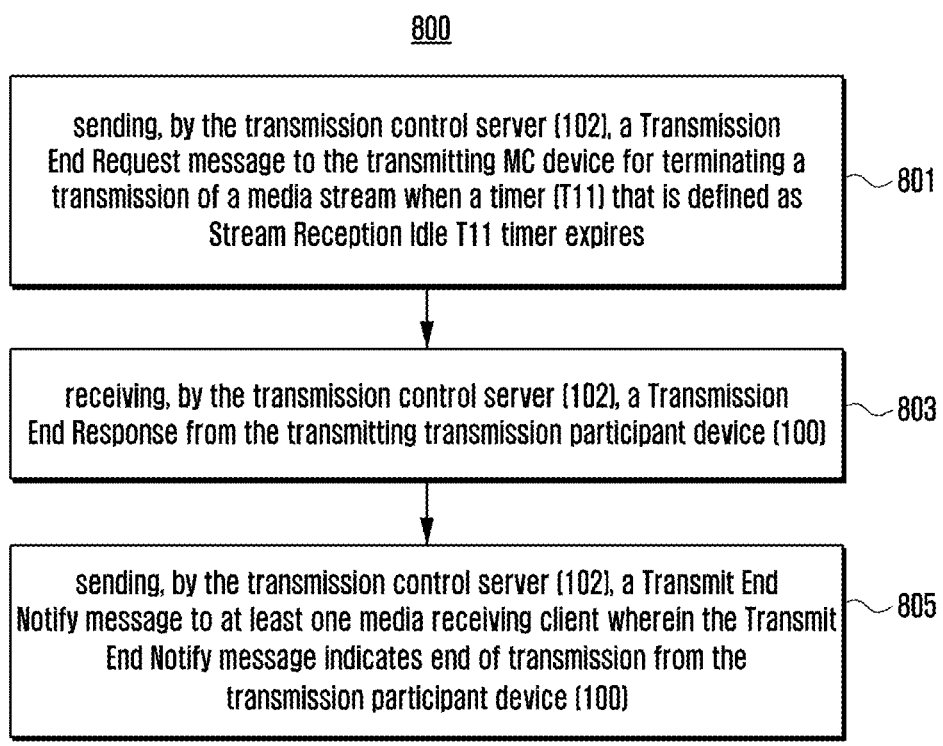
FIG. 8 illustrates a flow diagram for handling media transmission in the transmission control server according to embodiments of the present disclosure.

FIG. 8 illustrates a flow diagram for handling media transmissions in the transmission control server 102 according to embodiments of the present disclosure. Referring to FIG. 8, a method 800 may be implemented in the transmission control server 102 of the MC system 200 as shown in FIG. 2. Explanation will be made herein with respect to FIGS. 2 to 7 combined. In one implementation, the transmission control server 102 may perform the method 800. The method as disclosed in FIG. 8 is according to another embodiment of the transmission control server 102 as disclosed in FIG. 5.

According to FIG. 8, at step 801, the transmission control server 102 is configured to send a Transmission End Request message to the transmitting MC device 101 for termination of transmission of a media stream when a timer T11 expires. The timer T11 is referred as a Stream Reception Idle T11 timer. In some embodiments, the Transmission End Request includes at least one of "No receiving participant" reason in a "Reject Cause" field of the Transmission End Request that indicates a reason for the termination of the media stream.

At step 803, the transmission control server 102 is configured to receive a Transmission End Response from the transmitting transmission participant device 100. Thereafter, at step 805, the transmission control server 102 is configured to send a Transmit End Notify message to at least one media receiving client. In some embodiments, the Transmit End Notify message indicates the end of transmission from the transmission participant device 100.

In one implementation of the method 800, the transmission control server 102 is further configured to determine if any Media Transmission Request is present in a queue. If any Media Transmission Request is present in the queue, then the transmission control server 102 is configured to remove the Media Transmission Request from the queue. Thereafter, the transmission control server 102 may be configured to grant permission to a second transmission participant device 100 to send a media stream. In step 801, after sending the Transmission End Request message to the transmission participant device 100, the transmission control server 102 enters into a "Pending Transmit Revoke" state.

In yet another implementation of the method 800, further to step 803, after receiving the Transmission End Response message from the transmission participant device 100, the transmission control server 102 which is in a general transmission control operation state machine enters into a "Transmit Idle" state if, during a simultaneous transmission of the media stream, a counter value (Cx) reaches a minimum limit, or enters into a "Transmit Taken" state if the counter value (Cx) has not reached the minimum limit. The counter Cx is the same as the counter C11 discussed above. In other words, the transmission control server 102 which is in a general transmission control operation state machine enters into the "Transmit Idle" state if at this time no other transmission participant device 100 is transmitting media, or enters into the "Transmit Taken" state if at this time at least one transmission participant device 100 is transmitting media.

In yet another implementation of the method 800, further to step 803, after receiving the Transmission End Response message from the transmission participant device 100, the transmission control server 102 that is operating in a basic transmission control operation state machine stops a timer T3. The timer T3 is defined as a Transmission Revoke timer. Furthermore, the transmission control server 102 may be configured to enter into a "U: not permitted and Transmit Idle" state.

The basic transmission control operation may be limited to one state machine per user or group, and the general transmission control operation may be limited to one state machine per group. For example, if in a group call three users (MC Devices) are present, then in the server there may be one instance of the general transmission control operation state machine and three instances of the basic transmission control operation (One instance per User per Group).

Figure 9:
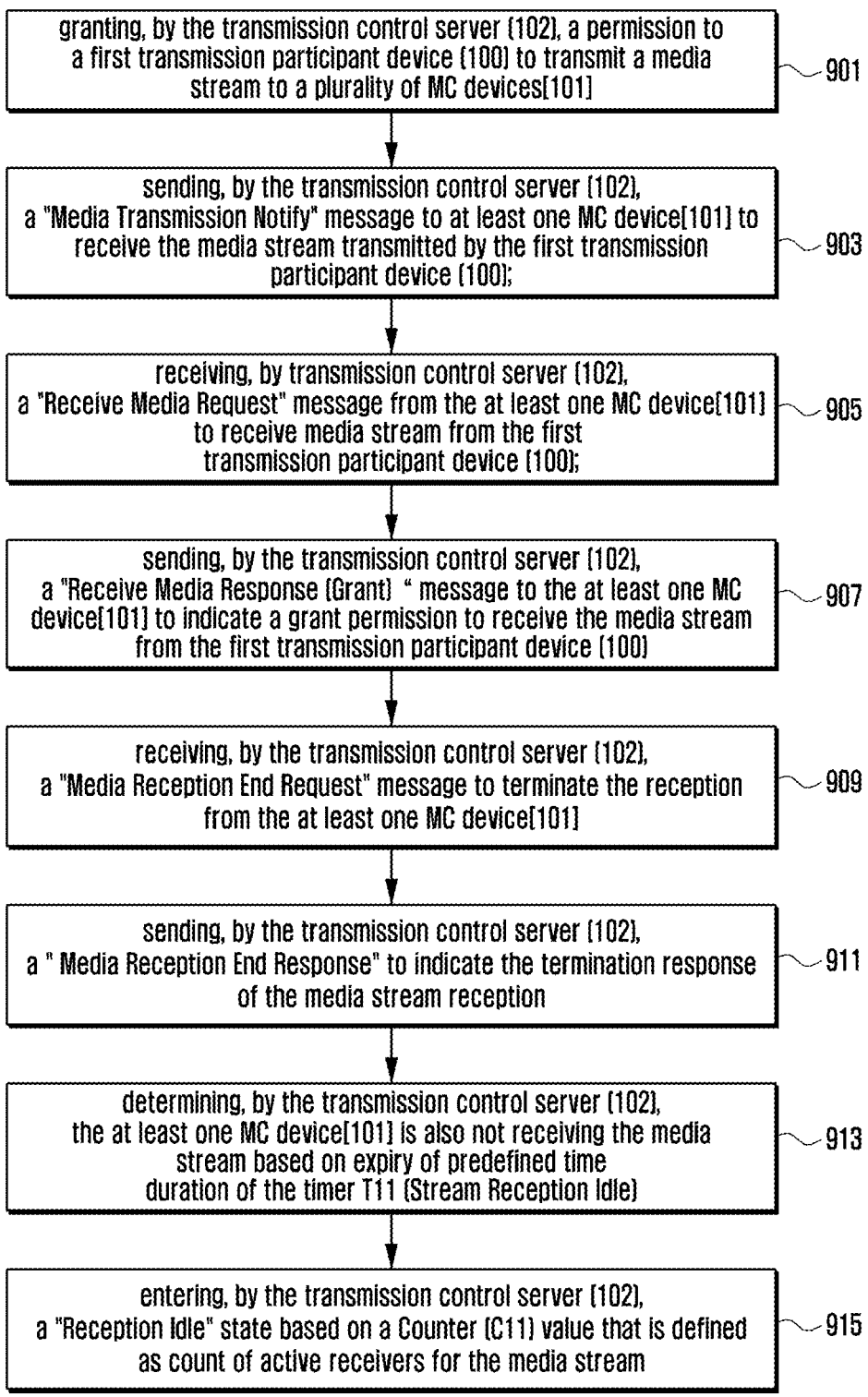
FIG. 9 illustrates a flow diagram for handling media transmission in the transmission control server according to embodiments of the present disclosure.

FIG. 9 illustrates a flow diagram for handling media transmissions in the transmission control server 102 according to embodiments of the present disclosure. Referring to FIG. 9, a method 900 may be implemented in the transmission control server 102 of the MC system 200 as shown in FIG. 2. Explanation will be made herein with respect to FIGS. 2 to 8 combined. In one implementation, the transmission control server 102 may perform the method 900. The method as disclosed in FIG. 9 is according to another embodiment of the transmission control server 102 as disclosed in the FIGS. 5 and 8.

According to FIG. 9, at step 901, the transmission control server 102 may be configured to grant permission to a first transmission participant device 100 to transmit a media stream to a plurality of MC devices 101. Thereafter, at step 903, the transmission control server 102 may be configured to send a "Media Transmission Notify" message to at least one MC device 101 to receive the media stream transmitted by the first transmission participant device 100. The transmission control server 102, at step 905, may be configured to receive a "Receive Media Request" message from the at least one MC device 101 to receive the media stream from the first transmission participant device 100. After step 905, at step 907, the transmission control server 102 may be configured to send a "Receive Media Response (Grant)" message to the at least one MC device 101 to indicate a grant of permission to receive the media stream from the first transmission participant device 100. Thereafter, at step 909, the transmission control server 102 may be configured to receive a "Media Reception End Request" message from the at least one MC device 101 to terminate the reception. At step 911, the transmission control server 102 may be configured to send a "Media Reception End Response" message to the MC device 101 to indicate the termination response of the media stream reception. After that, at step 913, the transmission control server 102 may be configured to determine the at least one MC device 101 is not receiving the media stream. This determination is based on the expiry of the predefined time duration of the timer T11 (the Stream Reception Idle timer). At step 915, the transmission control server 102 enters a "Reception Idle" state based on a counter (C11) value. The counter value provides a count of active receivers that are receiving the media stream.

In some embodiments, the counter C11 value is initialized to zero. Further, the counter C11 is associated with a transmitter synchronization source (SSRC) or UserId of the at least one MC device 101. Further, the timer T11 is defined as a stream reception idle timer which is started with the predefined time duration after the transmission control server 102 sends the "Media Transmission Notify" message to the at least one MC device 101, or if the counter C11 value reaches a minimum limit.

In some embodiments, the counter C11 value is incremented by 1 for each "Receive Media Response (Grant)" sent to an MC device 101, and the counter C11 value is decremented by one for each "Media Reception End Request" or "Media Reception End Response" message received from an MC device 101.

In some embodiments, the timer T11 may be disabled (or stopped) by the transmission control server 102 if at least one MC device 101 is granted permission to receive the media stream from the transmission participant device 100 by sending a grant of permission via a "Receive Media Request (Grant)" message, or if media transmission is ended by the transmission control server 102 by sending a "Transmission end notify" message to the at least one MC device 101. Thus, after the timer T11 expires (Stream Reception Idle expiry), the MC server 102 sends an indication to terminate the transmission. Various state machine diagrams with respect to the various entities as disclosed above shall be explained in detail in the forthcoming paragraphs.

Figure 10:
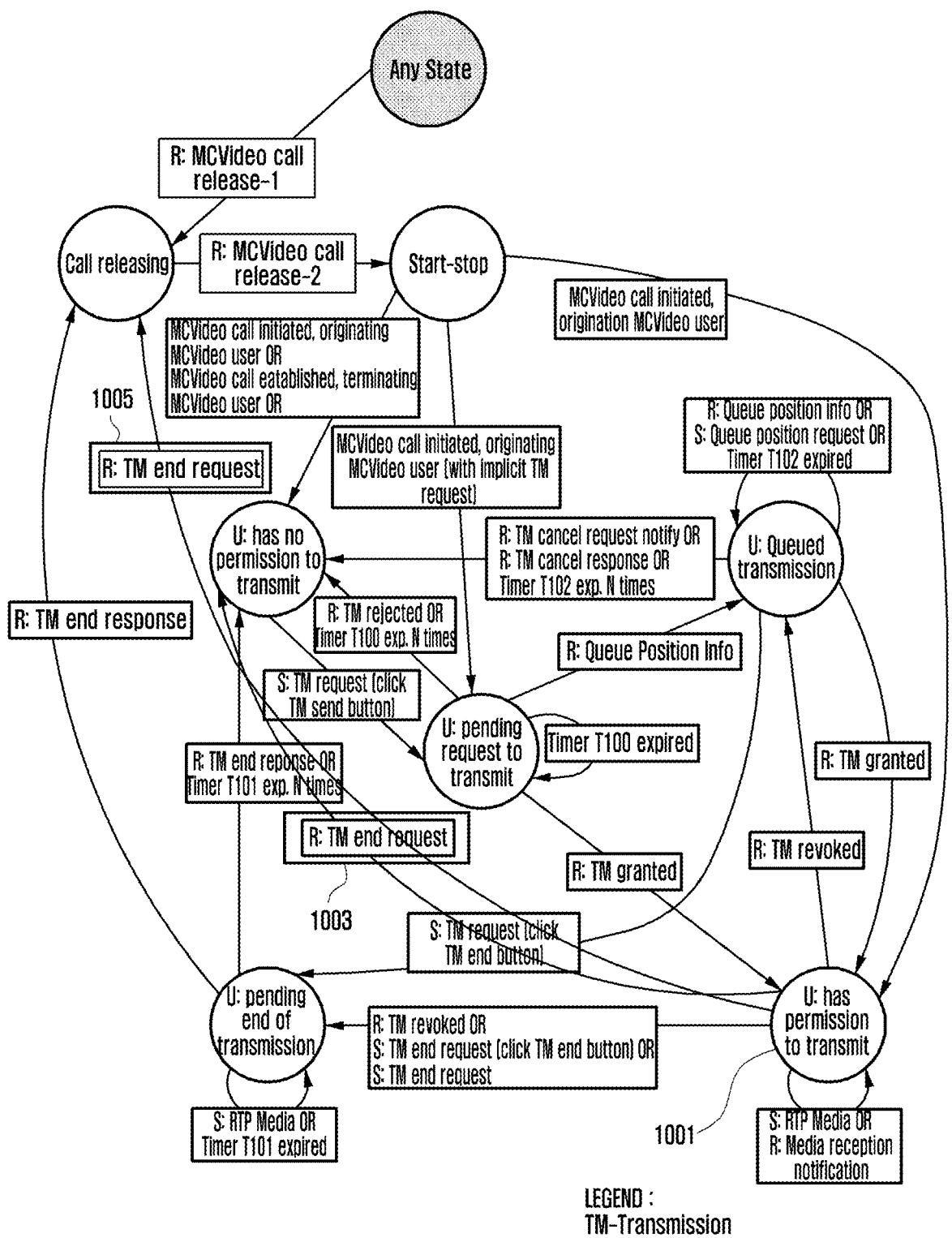
FIG. 10 illustrates a state diagram for a 'Transmission participant basic transmission control operation' according to embodiments of the present disclosure.

FIG. 10 illustrates a state diagram for a "Transmission participant basic transmission control operation" according to embodiments of the present disclosure. A new procedure has been added to receive a transmission end request from the transmission control server 102 and send a transmission end response from the transmission participant device 100. The state diagram as illustrated in FIG. 10 corresponds to method 700 as explained with respect to FIG. 7. Explanation of similar steps is avoided as applicable for the sake of brevity of the disclosure. The details of the state machine are explained as follows:

In an embodiment, when the state 1001 "has permission to transmit" is reached and upon receiving a "Transmission End Request message" 1003 or 1005 from the transmission control server 102, the transmission participant device 100:
1. shall inform the user that the permission to send RTP media is being revoked;
2. may give information to the user about the reason for terminating the permission to send media;
3. shall request the media in the MCVideo client 103 to discard any remaining buffered RTP media packets and to stop forwarding of encoded video to the MCVideo server 102; and
4. shall send a Transmission End Response message to the transmission control server 102.
5. if the session is not a broadcast group call or if the A-bit in the Transmission Indicator field is set to '1' (Normal call), shall enter the "U: has no permission to transmit" state; and
6. if the session was initiated as a broadcast group call:
   a. shall indicate to the MCVideo client 103 that the media transmission is completed; and
   b shall enter the "Call releasing" state.

Figure 11:
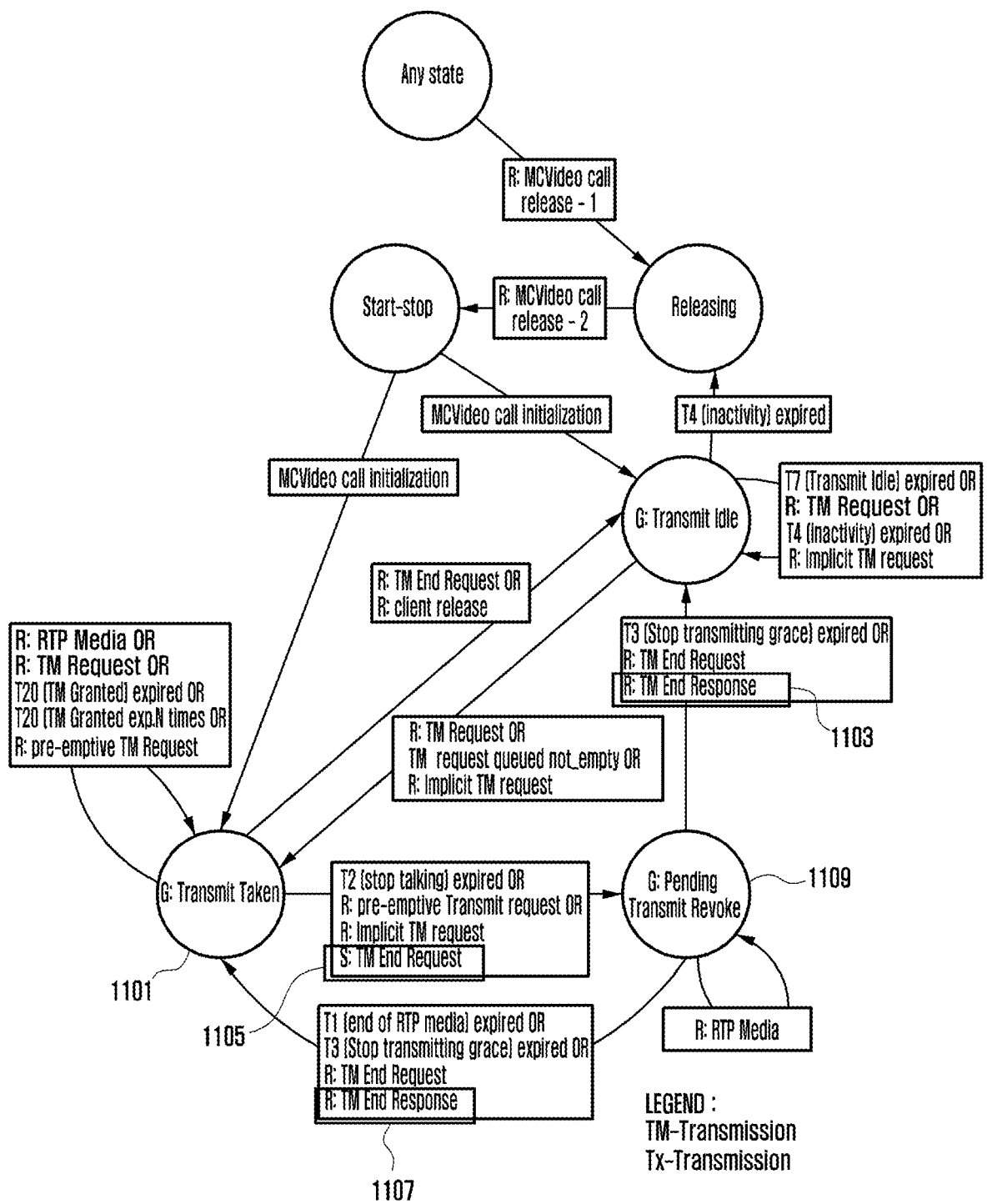
FIG. 11 illustrates a state diagram for a 'Transmission control server general transmission control operation' according to embodiments of the present disclosure.

FIG. 11 illustrates a state diagram for a "Transmission control server general transmission control operation" according to embodiments of the present disclosure. A new procedure has been added to process a transmission end request message and forward it to 'Transmission control server basic transmission control state machine'. The state diagram as illustrated in FIG. 11 corresponds to the methods 500, 800, and 900 as explained with respect to the FIGS. 5, 8, and 9. Explanation of similar steps is avoided as applicable for the sake of brevity of the disclosure. The details of the state machine are explained as follows:

In an embodiment, while in the state 1101 "G: Transmit Taken" and upon receiving a Transmission End Request message, transmission control arbitration logic in the transmission control server 102:
1. shall stop timer T4 (Transmission grant), if running;
2. shall include a Reject Cause field with the <Reject Cause> value set to #8 (No receiving participant);
   i. may include an additional text string explaining the reason for rejecting the Transmission request in the <Reject Phrase> value of the Reject Cause field; and
3. shall enter the "G: pending Transmission Revoke" state 1109.

In some embodiments, the transmission control arbitration logic in the transmission control server 102 enters into a "G: pending Transmission Revoke" state 1109 after having sent a Transmission Revoke or Transmission End Request message to the permitted transmission participant device 100. In this state, the MCVideo server 102 forwards RTP media packets to the other transmission participant devices 100 in the MCVideo call.

In some embodiments, the functionality of both the Transmission End Request message and the Transmission Revoke message sent from the server 102 is mostly the same on both the client and server side. The handling of the Transmission End Request message is added in the "G: Pending Transmission Revoke" state 1109 herein. A new state can also be created later for this purpose if required.

In some embodiments, when entering the "G: Pending Transmission Revoke" state 1109, the transmission control arbitration logic in the transmission control server 102:
1. shall send the Transmission Revoke or Transmission End Request message to the permitted transmission participant 100. The Transmission Revoke or Transmission End Request message:
   a. shall include the reason for sending the Transmission Revoke message or Transmission End Request in the <Reject Cause> value in the Reject Cause field; and
   b. if a group call is a broadcast group call, a system call, an emergency call, an imminent peril call, or a temporary group session, shall include the Transmission Indicator field with appropriate indications; and
2. shall set the general state to "G: pending Transmission Revoke" 1109.

In an embodiment, while in the state "G: pending Transmission Revoke" 1109, upon receiving a Transmission End Response message 1107, the transmission control arbitration logic in the transmission control server 102 performs the following:
1. shall request the media distributor in the MCVideo server to stop forwarding RTP media packets for the requesting transmission participant; and
2. shall decrease the counter value Cx (Simultaneous transmission video) by 1 if Cx (Simultaneous transmission video) has not reached its lower limit;
3. if Cx (Simultaneous transmission video) has reached lower limit, enter the "G: Transmit Idle" state.
4. if Cx (Simultaneous transmission video) has not reached lower limit and if the active Transmission request queue is not empty the transmission control server 102:
   a. shall select a queued Transmission request from the top of the active Transmission request queue;
   b. shall remove that queued Transmission request from the active Transmission request queue; and
   c. shall enter the "G: Transmit Taken" state 1101.

Figure 12:
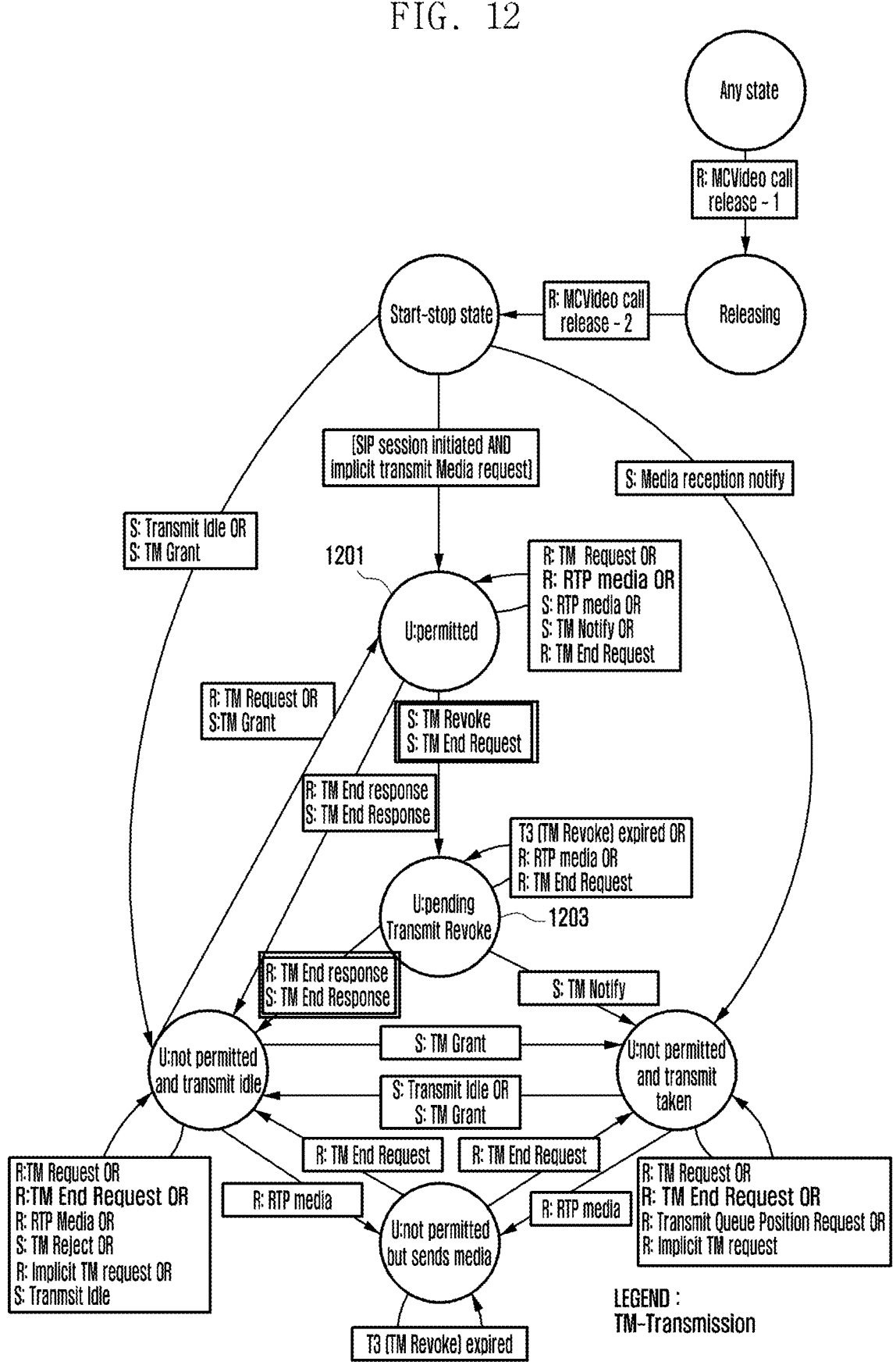
FIG. 12 illustrates a state machine diagram for a 'Transmission control server basic transmission control operation towards transmission participant' according to embodiments of the present disclosure.

FIG. 12 illustrates a state machine diagram for a "Transmission control server basic transmission control operation towards transmission participant operation", according to embodiments of the present disclosure. A new procedure has been added to send a transmission end request from the transmission control server 102 to the transmission participant device 100 and to process a transmission end response from the transmission participant device 100. The state diagram as explained in FIG. 12 corresponds to the methods 500, 800, and 900 as explained with respect to FIGS. 5, 8, and 9. Explanation of similar steps is avoided as applicable for the sake of brevity of the disclosure. The details of the state machine are explained as follows:

In some embodiments, while in the state 1201 "U: permitted" and upon receiving a Transmission End Request message from the transmission control server 102, the transmission control interface towards the MCVideo client 103 in the transmission control server 102:
1. shall forward the Transmission End Request message to the associated transmission participant 100; and
2. shall enter the state 1203 "U pending Transmit Revoke".

In an embodiment, with respect to the state 1203 "U: pending Transmit Revoke", the transmission control interface towards the MCVideo client 103 in the transmission control server 102 uses this state during the grace period after sending the Transmission Revoke or Transmission End Request message.

In this state a timer T3 (Transmission Revoke) is running.

In some embodiments, the functionality of both a Transmission End Request message and a Transmission Revoke message sent from the transmission control server 102 is mostly the same on both the client and server side. The handling of the Transmission End Request message is added in the "U: pending Transmit Revoke" state 1203 and the timer T3 (Transmission Revoke) is also used for the Transmission End Request message. A new state and timer can also be created later for this purpose if required.

In some embodiments, while in the state "U: pending Transmit Revoke" 1203, upon expiry of the timer T3 (Transmission Revoke), the transmission control interface towards the MCVideo client 103 in the transmission control server 102:
1. shall retransmit the Transmission Revoke or Transmission End Request message to the associated transmission participant 100. The Transmission Revoke message or Transmission End Request:
   a. shall include the same Rejection Cause field and the same Transmission Indicator field as in the previous sent Transmission Revoke message or Transmission End Request;
2. shall start timer T3 (Transmission Revoke); and
3. shall remain in the "U: pending Transmit Revoke" state 1203.

The number of times the transmission control server 102 retransmits the Transmission Revoke message or the Transmission End Request and the action to take when the transmission control server 102 gives up is an implementation option. However, it is recommended that the MCVideo client 103 is disconnected from the MCVideo call when the transmission control server 102 gives up.

In some embodiments, while in the state "U: pending Transmit Revoke" 1203, and upon receiving a Transmission End Response message from the associated transmission participant device 100, the transmission control interface towards the MCVideo client 103 in the transmission control server 102:
1. if the first bit in the subtype of the Transmission End Response message is set to '1' (Acknowledgment is required), shall send a Transmission control Ack message. The Transmission control Ack message:
   a. shall include the Message Type field set to '1' (Transmission End Response); and
   b. shall include the Source field set to '2' (the controlling MCVideo function is the source);
2. shall stop timer T3 (Transmission Revoke) if it is running; and
3. shall forward the Transmission End Response message to the transmission control server arbitration logic; and
4. shall enter the state "U: not permitted and Transmit Idle".

Figure 13:
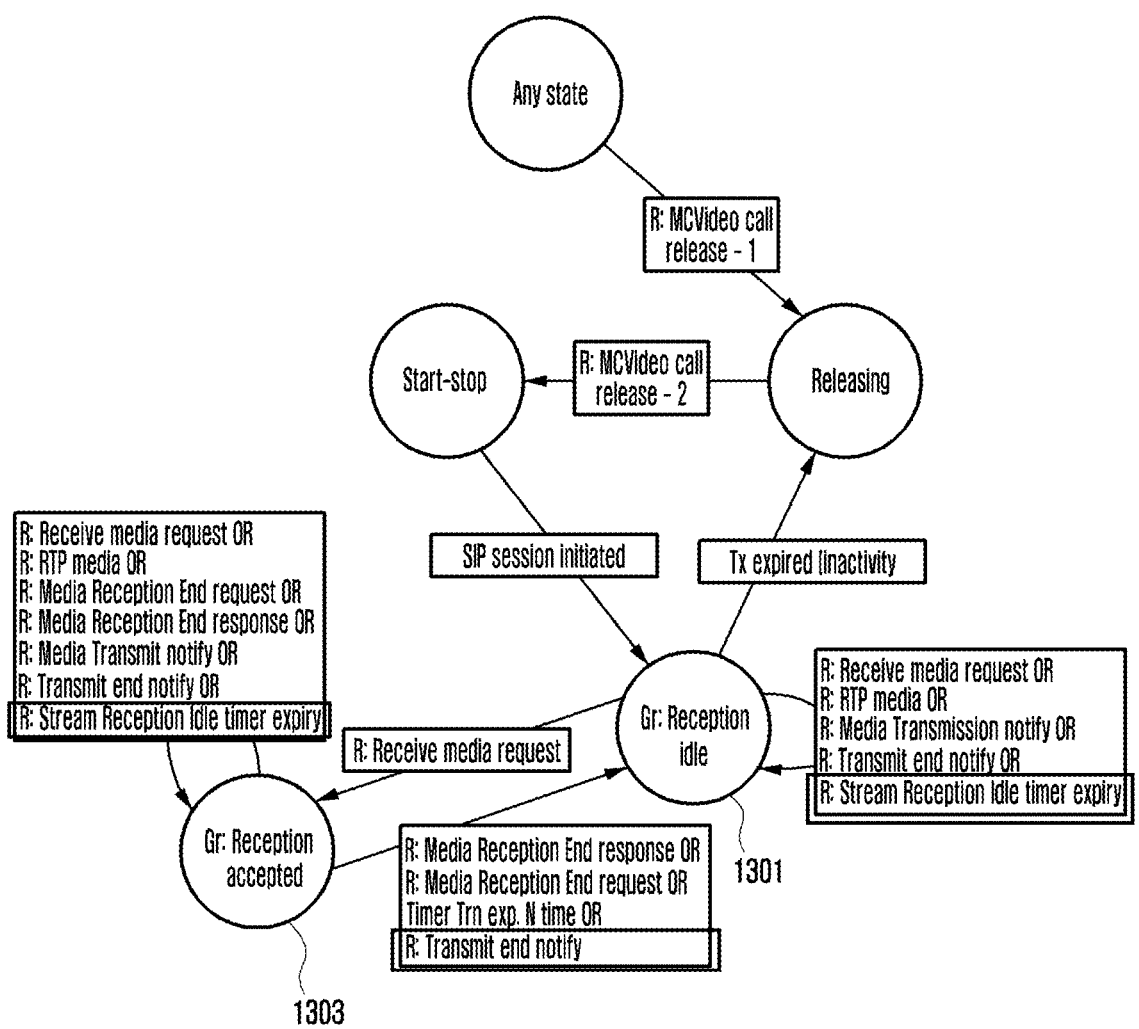
FIG. 13 illustrates the state machine diagram for 'Transmission control server general reception control operation' according to embodiments of the present disclosure.

FIG. 13 illustrates a state machine diagram for a "Transmission control server general reception control operation" according to embodiments of the present disclosure. A new timer and new counter are introduced. The new timer will be started when none of the MCVideo users are receiving the stream even though the stream is currently being transmitted from another MCVideo user. The new timer may be stopped when at least one user is granted permission to receive the stream. The new Counter is used to track a count of active receiving users for the stream. When there are no active receivers for the stream, the general reception control operation state machine will inform transmission control arbitration logic to terminate the ongoing transmission. The state diagram as illustrated in FIG. 13 corresponds to the methods 500, 800, and 900 as explained with respect to FIGS. 5, 8, and 9. Explanation of similar steps is avoided as applicable for the sake of brevity of the disclosure. The details of the state machine are explained as follows:

In some embodiments, while in the state 1301 "Gr: Reception Idle" and upon receiving a media transmission request notify message, the reception control arbitration logic in the transmission control server 102:

1. shall send the Media Transmission Notify message to all other transmission participants 100. The Media Transmission Notify message:
   a. if a group call is a broadcast group call, system call, emergency call, or an imminent peril call, shall include the Reception Mode field set to '0' indicating automatic reception mode;
   b. If a group call is not a broadcast group call, system call, emergency call or an imminent peril call, shall include the Reception Mode field set to '1' indicating manual reception mode.
2. shall start timer T11 (Stream Reception Idle) and associate it with the transmitter SSRC or UserId.
3. shall initialize a counter C11 (Count of active receivers for the stream) to '0' & associate it with the transmitter SSRC or UserId.
4. shall remain in the "Gr: Reception Idle" state 1301.

In some embodiments, while in the state 1301 "Gr: Reception Idle" and upon receiving a Receive Media Request message, the reception control arbitration logic in the transmission control server 102:
1. if the Receive Media Request is rejected:
   a. shall send the Receive Media Response (Rejected) message. The Receive Media Response message:
      i. if the first bit in the subtype of the Receive media response message is set to '1' (Acknowledgment is required), shall send a Transmission control Ack message; and
      ii. shall include the Result field set to '0' (Receive media rejected); and
   b. shall remain in the "Gr: Reception idle" state 1301; or
2. if the Receive Media Request is granted:
   a. shall stop timer T5 (Reception Inactivity);
   b. shall stop timer T11 (Stream Reception Idle) if it is already running;
   c. shall increment the counter C11 (Count of Active Receivers for the stream) associated with the transmitter SSRC by 1;
   d. shall store the SSRC of transmission participant 100 requesting to receive media until the reception is finished associated with that Transmission request;
   e. shall send the Receive Media Response message. The Receive Media Response message:
      i. if the first bit in the subtype of the Receive media response message is set to '1' (Acknowledgment is required), shall send a Transmission control Ack message; and
      ii. shall include the Result field set to '1' (Receive media granted);
   f. shall increase C7 (Reception Accepted) by 1 if it has not reached its upper limit; and
   g. shall enter the "Gr: Reception accepted" state 1303.

In an embodiment, while in the state 1301 "Gr: Reception Idle" and upon receiving a transmission end notify message, the reception control arbitration logic in the transmission control server 102:
1. shall send the Transmission End Notify message to all other transmission participants 100.
2. shall stop timer T11 (Stream Reception Idle) associated with the transmitter SSRC, if running;
3. shall remain in the "Gr: Reception Idle" state 1301.

In an embodiment, while in the state 1301 "Gr: Reception Idle" and upon expiry of timer T11 (Stream Reception Idle), the reception control arbitration logic in the transmission control server 102:

1. shall communicate to the transmission control arbitration logic in transmission control server 102 to terminate the stream associated to the expired timer T11.
2. shall remain in the "Gr: Reception Idle" state 1301.

In some embodiments, terminating the stream by sending a Transmission Revoke message or a Transmission End Request message is decided based on the MCVideo server 102's local policy.

In an embodiment, while in the state 1303 "Gr: Reception accepted" and upon receiving a Receive Media Request message, the reception control arbitration logic in the transmission control server 102:

1. if the Receive Media Request is rejected:
    a. shall send the Receive Media Response (Rejected) message. The Receive Media Response message:
        i. if the first bit in the subtype of the Receive media response message is set to '1' (Acknowledgment is required), shall send a Transmission control Ack message; and
        ii. shall include the Result field set to '0' (Receive media rejected); and
    b. shall remain the "Gr: Reception accepted" state 1303; or
2. if the Receive Media Request is granted:
    a. shall stop timer T5 (Inactivity);
    b. shall stop timer T11 (Stream Reception Idle) associated with the transmitter SSRC, if running;
    c. shall increment the counter C11 (Count of Active Receivers for the stream) associated with the transmitter SSRC by 1;
    d. shall store the SSRC of transmission participant 100 requesting to receive media until the reception is finished associated with that Transmission request;
    e. shall send the Receive Media Response (Granted) message. The Receive Media Response message:
        i. if the first bit in the subtype of the Receive media response message is set to '1' (Acknowledgment is required), shall send a Transmission control Ack message; and
        ii. shall include the Result field set to 1 (Receive media granted);
    f. shall start timer T6 (Reception Granted);
    g. shall increase C7 (Reception Accepted) by 1 if it has not reached its upper limit; and
    h. shall remain in the "Gr: Reception accepted" state 1303.

In an embodiment, while in the state 1303 "Gr: Reception accepted" and upon receiving a Receive Media End Request message, the reception control arbitration logic in the transmission control server 102:

1. shall send the Receive Media End Response message. The Receive Media End Response message:
    i. if the first bit in the subtype of the Receive media end response message is set to '1' (Acknowledgment is required), shall send a Transmission control Ack message.
    ii. shall include the Message Type field set to 'y' (Receive media end granted);
2. shall stop timer T6 (Reception Granted);
3. shall decrement the counter C11 (Count of Active Receivers for stream) by 1, if it has not reached its lower limit;
4. if C11 has reached its lower limit, shall start timer T11 (Stream Reception Idle).
5. shall decrease C7 (Reception Accepted) by 1 if it has not reached its lower limit;
6. if C7 has not reached its lower limit, shall remain in the "Gr: Reception accepted" state 1303.
7. if C7 has reached its lower limit, shall enter the "Gr: Reception Idle" state 1301.

In some embodiments, the decision to start the same timer T11 or a new timer, when all the transmission participants 100 have stopped reception, can be made based on the MCVideo server 102's local policy.

In an embodiment, while in the state 1303 "Gr: Reception accepted" and upon receiving a Receive Media End Response message, the reception control arbitration logic in the transmission control server 102:

1. if the first bit in the subtype of the Receive media end response message is set to '1' (Acknowledgment is required), shall send a Transmission control Ack message.
2. shall stop timer T6 (Reception Granted);
3. shall decrement the counter C11 (Count of Active Receivers for the stream) by 1, if it has not reached its lower limit;
4. if C11 has reached its lower limit, shall start timer T11 (Stream Reception Idle).
5. shall decrease C7 (Reception Accepted) by 1 if it has not reached its lower limit;
6. if C7 has not reached it lower limit, shall remain in the "Gr: Reception accepted" state 1303.
7. if C7 has reached it lower limit, shall enter the "Gr: Reception Idle" state 1301.

In an embodiment, while in the state 1303 "Gr: Reception accepted" and upon receiving a media transmission request notify message, the reception control arbitration logic in the transmission control server 102:

1. shall send the Media Transmission Notify message to all other transmission participants 100. The Media Transmission Notify message:
    a. if a group call is a broadcast group call, system call, emergency call or an imminent peril call, shall include the Reception Mode field set to '0' indicating automatic reception mode; and
    b. if a group call is not a broadcast group call, system call, emergency call or an imminent peril call, shall include the Reception Mode field set to '1' indicating manual reception mode; and
2. shall start timer T11 (Stream Reception Idle) and associate it with the transmitter SSRC or UserId present in Media Transmission Notify message.
3. shall initialize a counter C11 (Count of Active Receivers for the stream) to 0 & associate it with the transmitter SSRC or UserId present in Media Transmission Notify message.
4. shall remain in the "Gr: Reception Accepted" state 1303.

In an embodiment, while in the state 1303 "Gr: Reception Accepted" and upon receiving a Transmission End Notify message, the reception control arbitration logic in the transmission control server 102:

1. shall send the Media Transmission End Notify message to all other transmission participants 100.
2. shall stop timer T11 (Stream Reception Idle) associated with the transmitter SSRC, if running;
3. shall decrease C7 (Reception Accepted) by the value of C11 (Count of Active Receivers for the stream) associated with the transmitter SSRC; In an implementation, a difference of the values of C7 and C11 may be considered as the counter value for deciding the state of the transmission control server 102. In particular, after the counter value reaches the minimum limit, the transmission control server 102 enters into the "Gr: Reception Idle" state 1301, otherwise the transmission control server 102 enters into the "Gr: Reception Accepted" state 1303.
4. if C7 has not reached it lower limit, shall remain in the "Gr: Reception accepted" state 1303.
5. if C7 has reached it lower limit, shall enter the "Gr: Reception Idle" state 1301.

In an embodiment, while in the state 1303 "Gr: Reception accepted" and upon expiry of timer T11 (Stream Reception Idle), the reception control arbitration logic in the transmission control server 102:

1 shall communicate to the transmission control arbitration logic in transmission control server 102 to terminate the stream associated to the expired timer T11.
2. shall remain in the "Gr: Reception Accepted" state 1303.

In some embodiments, terminating the stream by sending a Transmission Revoke message or a Transmission End Request message is decided based on the MCVideo server 102's local policy.

In an embodiment, when transmission of a stream is terminated because of T11 timer expiry, a Transmission end request is sent from the transmission control server 102 with Reject cause #8 as explained in detail below.

Cause #8—No Receiving Participant

The <Reject cause> value set to '8' indicates that the MCVideo client 103's permission to send media is being revoked because there is no participant to receive the stream.

In some embodiments, the Reject Cause value field is added to the Transmission end request message to indicate a reason for ending the transmission. The basic format of a Transmission end request message can be seen in table 1:

TABLE 1

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |
| \|V = 2\|P\| Subtype \| | PT = APP = 204 \| | length | \| |
| \| | SSRC of transmission control participant | | \| |
| | name = MCV2 | | \| |
| \| | User ID field | | \| |
| \| | Reject Cause value | | \| |

The Reject Cause field for the Transmission End Request message includes a <Reject Cause> cause value in the Reject Cause field explaining why the transmission control server 102 wants the transmission participant 100 to stop sending media, and can be followed by additional information. Therefore, the length of the packet can vary depending on the value of the rejection cause.

In some embodiments, the timer T11 (the Stream Reception Idle timer) is used in the transmission control server 102. The timer will be started when none of the MCVideo users are receiving a stream even though the stream is currently being transmitted from another MCVideo user. The timer may be stopped when at least one user is granted permission to receive the stream. Basic details of the Timer T11 are shown in Table 2.

TABLE 2

| Timer | Timer value | Cause of start | Normal stop | On expiry |
|---|---|---|---|---|
| T11 (Stream Reception Idle) | Default value: 10 seconds. Configurable. | Reception of Receive Media End Request/Response from MCVideo client or when server sends Media Transmission Notification to MCVideo client | Reception of Receive Media Request [granted] message from arbitration logic | When T11 expires, transmitting stream will be terminated |

In some embodiments, the counter C11 (Count of active receivers for the stream) is used in the transmission control server 102, and the counter stores a count of the active receiving users for that stream. Basic details of counter C11 are shown in Table 3.

TABLE 3

| Counter | Limit | Associated timer | On reaching the limit |
|---|---|---|---|
| C11 (Count of active receivers for the stream) | Default value: 4 Configurable. | — | Receive media requests from transmission participant is rejected. |

NOTE:
If a counter value is not configured the default value shall be used.

In summary, the above disclosure provides the following:
1. Handling of Transmission (TM) End Request & Response message and state transition based on this message handling in Client and Server side.
2. A new counter C11 (Count of active receivers for the stream) is introduced to store active receiver count per stream. Counter initialization/increment/decrement based on different message handling and state transition based on counter value is provided.
3. A new timer T11 (Stream Reception Idle) and timer stop/start/expiry handling in server state machine is provided.
4. A method of terminating a stream, and informing the transmitting user of a reason for the termination when none of the other users are receiving the stream with the help of the newly introduced "Reject Cause Value" field & Cause in a Transmission (TM) End Request message, and handling all race conditions in the transmission control server 102.

Thus, the disclosure avoids wastage of network resources and gives other participants in the group a chance to transmit important data, since the maximum number of transmissions at a time in a group call is limited by network capacity. This solution improves efficiency of the Mission Critical Video (MCVideo) system in the high network congestion scenarios in which Emergency Mission Critical systems generally operate.

Figure 14:
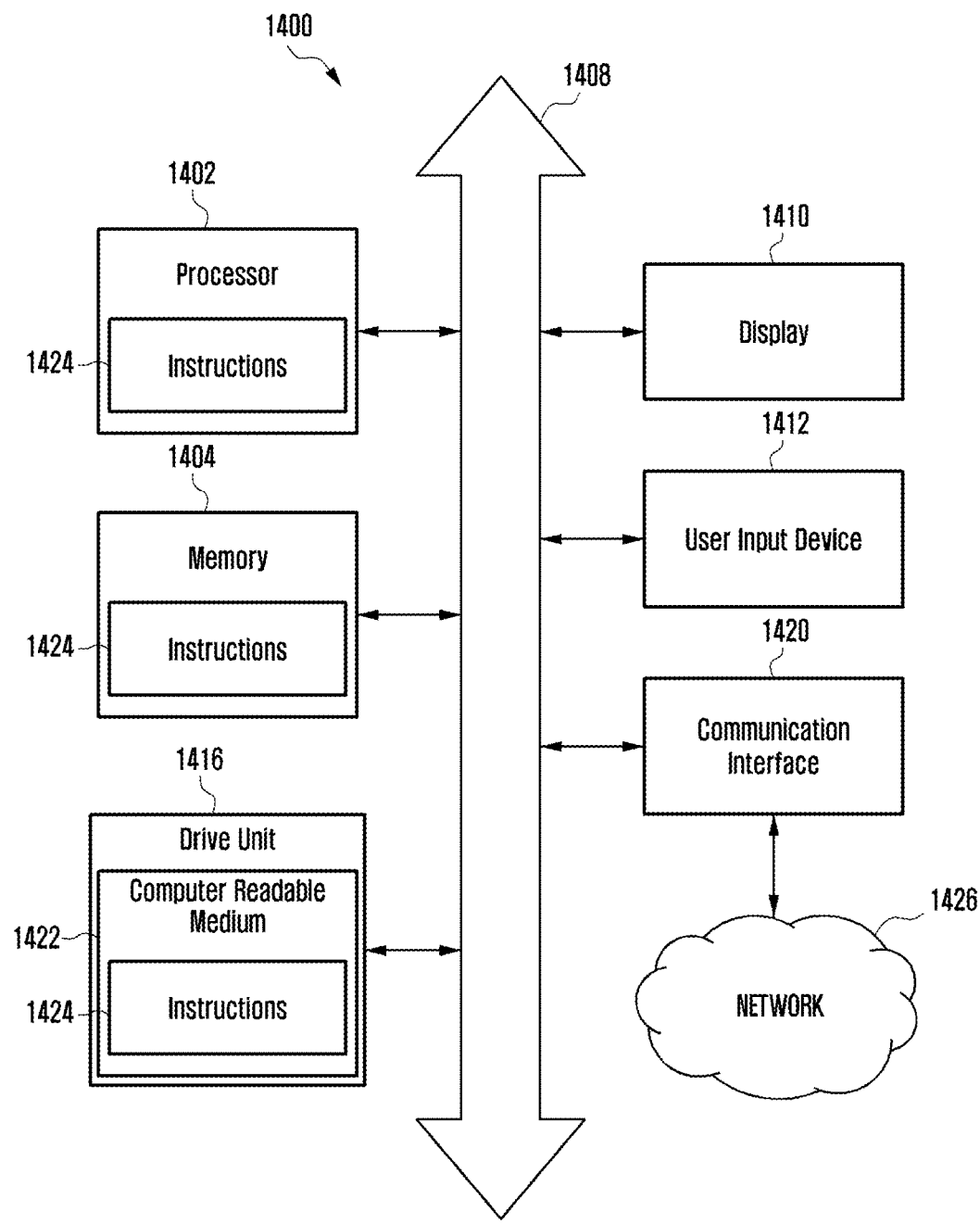
FIG. 14 illustrates a hardware configuration of the system in the form of a computer system according to embodiments of the present disclosure.

FIG. 14 illustrates a hardware configuration of the system in the form of a computer system 1400 according to embodiments of the present disclosure. The computer system 1400 can include a set of instructions that can be executed to cause the computer system 1400 to perform any one or more of the methods disclosed herein. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1400 is illustrated, the term "system" shall also be taken to include any collection of systems or sub-systems that individually or jointly execute a set, or multiple sets, of instructions to perform one or more computer functions.

The computer system 1400 may include a processor 1402, e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application-specific integrated circuits, field-programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404, such as a memory 1404 that can communicate via a bus 1408. The memory 1404 may include, but is not limited to computer-readable storage media such as various types of volatile and non-volatile storage media, including but not limited to random access memory (RAM), read-only memory (ROM), programmable read-only memory (PROM), electrically programmable read-only memory (EPROM), electrically erasable programmable read-only memory (EEPROM), flash memory, magnetic tape or disk, optical media and the like. In one example, memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. The memory 1404 is operable to store instructions executable by the processor 1402. The functions, acts or tasks illustrated in the figures or described herein may be performed by the programmed processor 1402 for executing the instructions stored in the memory 1404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1400 may or may not further include a display unit 1410, such as a liquid crystal display (LCD), an organic light-emitting diode (OLED), a flat panel display, a solid-state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or the drive unit 1416.

Additionally, the computer system 1400 may include an input device 1412 configured to allow a user to interact with any of the components of system 1400. The computer system 1400 may also include a disk or optical drive unit 1416. The disk drive unit 1416 may include a computer-readable medium 1422 in which one or more sets of instructions 1424, e.g. software, can be embedded. Further, the instructions 1424 may embody one or more of the methods or logic as described. In a particular example, the instructions 1424 may reside completely, or at least partially, within the memory 1404 or within the processor 1402 during execution by the computer system 1400.

The disclosure contemplates a computer-readable medium that includes instructions 1424 or receives and executes instructions 1424 responsive to a propagated signal so that a device connected to a network 1426 can communicate voice, video, audio, images, or any other data over the network 1426. Further, the instructions 1424 may be transmitted or received over the network 1426 via a communication port or interface 1420 or using a bus 1408. The communication port or interface 1420 may be a part of the processor 1402 or maybe a separate component. The communication port 1420 may be created in software or may be a physical connection in hardware. The communication port 1420 may be configured to connect with a network 1426, external media, the display 1410, or any other components in system 1400, or combinations thereof. The connection with the network 1426 may be a physical connection, such as a wired Ethernet connection or may be established wirelessly as discussed later. Likewise, the additional connections with other components of the system 1400 may be physical or may be established wirelessly. The network 1426 may alternatively be directly connected to the bus 1408.

The network 1426 may include wired networks, wireless networks, Ethernet AVB networks, or combinations thereof. The wireless network may be a cellular telephone network, an 802.11, 802.16, 802.20, 802.1Q or WiMax network. Further, the network 1426 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

Figure 15:
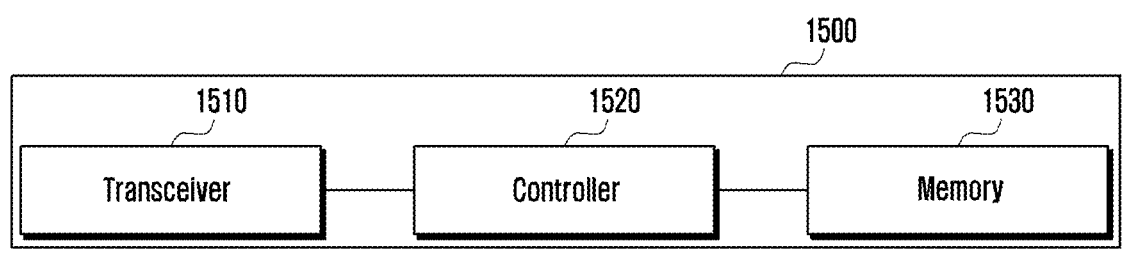
FIG. 15 illustrates a block diagram of an MC device according to embodiments of the present disclosure.

FIG. 15 illustrates a block diagram of an MC device, such as MC device 101, according to embodiments of the present disclosure.

Referring to FIG. 15, an MC device 1500 includes a transceiver 1510, a controller 1520, and a memory 1530.

The transceiver 1510 is capable of transmitting/receiving signals to/from other MC devices, servers, or entities according to the embodiments of the disclosure.

The controller 1520 is capable of controlling operations of the MC device 1500. The controller 1520 is capable of controlling the MC device 1500 to perform operations related to the MC device 1500 as described in the embodiments of the disclosure.

The memory 1530 is capable of storing at least one of the following: information related to the MC device 1500 and information transmitted/received via the transceiver 1510.

Figure 16:
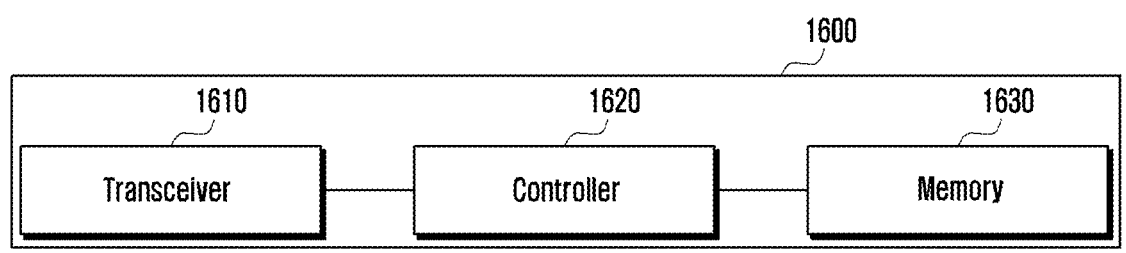
FIG. 16 illustrates a block diagram of an MC server according to embodiments of the present disclosure.

FIG. 16 illustrates a block diagram of an MC server, such as MC server 102, according to embodiments of the present disclosure.

Referring to FIG. 16, an MC server 1600 includes a transceiver 1610, a controller 1620, and a memory 1630. The MC server 1600 may be a transmission control server 102 as described in the embodiments of the disclosure.

The transceiver 1610 is capable of transmitting/receiving signals to/from other MC devices, servers, or entities according to the embodiments of the disclosure.

The controller 1620 is capable of controlling operations of the MC server 1600. The controller 1620 is capable of controlling the MC server 1600 to perform operations related to the MC server 1600 as described in the embodiments of the disclosure.

The memory 1630 is capable of storing at least one of the following: information related to the MC server 1600 and information transmitted/received via the transceiver 1610.

According to an embodiment of the disclosure, a method to handle media transmission in mission critical (MC) system is provided. The method comprises: receiving, by an MC server, a request from a first sender for transmitting a media stream to at least one receiver; sending, by the MC server, a notification to the at least one receiver to receive the media stream transmitted by the first sender; initiating, by the MC server, a timer with a predefined time duration after sending the notification; determining, by the MC server, that the notification to receive the media stream is rejected or not-accepted by the at least one receiver within the predefined time duration of the timer; and sending, by the MC server, a transmission end request to the first sender to terminate the request for media stream transmission based on one of the rejection or non-acceptance of the reception of the media stream.

In the embodiment of the disclosure, wherein after sending the notification to the at least one receiver, the method further comprising: checking, by the MC server, for an acceptance of the transmitted media by the at least one receiver; and terminating, by the MC server, a transmission of the media stream from the first sender device based on one of the rejection or non-acceptance of the reception of the media stream by the at least one receiver.

In the embodiment of the disclosure, the method further comprises receiving, by the MC server, a transmission end response from the first sender in response to sending the transmission end request, wherein the transmission end request includes a reason for ending the transmission, and wherein the reason for ending the transmission is due to the absence of the at least one receiver for receiving the media stream.

In the embodiment of the disclosure, the method further comprises granting, by the MC server, a second sender to transmit a new media stream to the at least one receiver after sending the transmission end request to the first sender.

In the embodiment of the disclosure, the method further comprises accepting the notification to receive the media stream comprising: receiving, by the MC server, a request to receive media stream from at least one receiver; sending, by an MC server, a response to the at least one receiver to inform about reception grant permission; and incrementing a counter value by one for each active receiver from the at least one receiver based on the reception of the grant permission.

In the embodiment of the disclosure, the method further comprises receiving, by the MC server, a request to terminate the media stream reception from the at least one receiver; sending, by the MC server, a response to indicate the termination of the media stream reception; decrementing, by the MC server, the counter value by one for each termination of the media stream reception from the at least one receiver; determining, by the MC server, that the at least one receiver is not receiving the media stream based on a timer expiry; and entering, by the MC server, a "reception idle" state based on the counter value.

In the embodiment of the disclosure, the method further comprises re-initiating the timer with the predefined time duration when the counter value reaches a minimum predefined value after the decrementation of each counter value or at a time at which the MC server sends a "Media Transmission Notify" message to the MC device.

In the embodiment of the disclosure, the method further comprises further comprising terminating the timer, by the MC server, based on at least one of: a) if the at least one receiver accepts the notification to receive the media; or b) if media transmission ended by the Transmission control server 102 by sending Transmission end notify message.

In the embodiment of the disclosure, wherein after the timer expiry, the MC server send a transmission end request to the first sender to terminate the transmission.

In the embodiment of the disclosure, wherein the first sender and the at least one receiver belongs to a same group of MC devices, and wherein the media stream includes at least one of video and audio data.

According to yet another embodiment of the disclosure, a method to handle media transmission in mission critical (MC) system is provided. The method comprises: receiving, by an MC device, a transmission end request from an MC server for terminating a media stream transmission; notifying, by the MC device, to a user associated with the MC device a reason for termination of media stream transmission, wherein the reason for ending the transmission is due to an absence of at least one receiver device for receiving the media stream; sending, by the MC device, a transmission end response to the MC server; and terminating, by the MC device, transmitting the media stream to the MC server.

According to yet another embodiment of the disclosure, a method to handle media transmission in mission critical (MC) system in plurality of MC devices is provided. The method comprises: receiving, by a transmission participant device 100, a Transmission End Request from a Transmission Control Server 102; notifying, by the transmission participant device 100 to a user associated with the transmission participant device 100, a media stream termination reason indicating client's permission to send a media is being revoked as result of an absence of at least one participant device to receive the media stream; sending, by the transmission participant device 100, a Transmission End Response to the Transmission Control Server 102; and terminating, by the transmission participant device 100, sending of the media stream to the Transmission Control Server 102.

In the embodiment of disclosure, the method further comprises entering, by the transmission participant device 100, in a "Call Releasing" state for a broadcast group call or a "Has no permission to transmit" state for a normal or a non-broadcast group call, wherein the transmission participant device 100 is the MC device 101 and associated with a same group.

According to yet another embodiment of the disclosure, a method to handle media transmission in mission critical (MC) system in a Transmission Control Server 102 is provided. The method comprises: sending, by the transmission control server 102, a Transmission End Request message to the transmitting MC device for terminating a transmission of a media stream when a timer (T11) that is defined as Stream Reception Idle timer expires; receiving, by the transmission control server 102, a Transmission End Response from the transmitting transmission participant device 100; and sending, by the transmission control server 102, a Transmit End Notify message to at least one media receiving client, wherein the Transmit End Notify message indicates end of transmission from the transmission participant device 100.

In the embodiment of the disclosure, the method further comprises: determining, by the transmission control server 102, if any Media Transmission Request is present in a queue; and removing, by the transmission control server 102, the media transmission request from the queue; and granting, by transmission control server 102, a permission to send media stream to a second transmission participant device 100, wherein after sending the Transmission End Request message to the transmission participant device 100, the transmission control server 102 enters to a "pending Transmit Revoke" state.

In the embodiment of the disclosure, wherein after receiving the Transmission End Response message from the transmission participant device 100, the transmission control server 102 in general transmission control operation state machine enters to a "Transmit Idle" state if during a simultaneous transmission of the media stream a counter value (Cx) reaches minimum limit or enters "Transmit Taken'" if the counter value (Cx) has not reached to the minimum limit.

In the embodiment of the disclosure, wherein after receiving the Transmission End Response message from the transmission participant device 100, the transmission control server 102 operating in a basic transmission control operation state machine, stops a timer (T3) defined as Transmission Revoke timer and enters a 'U: not permitted and Transmit Idle' state.

In the embodiment of the disclosure, wherein the Transmission End Request includes at least one of "No receiving participant" reason in a "Reject Cause" field of the Transmission End Request to indicate reason for termination of the media stream.

According to yet another embodiment of the disclosure, a method to handle media transmission in mission critical (MC) system in a Transmission Control Server 102 is provided. The method comprises: granting, by the transmission control server 102, a permission to a first transmission participant device 100 to transmit a media stream to a plurality of MC devices 101; sending, by the transmission control server 102, a "Media Transmission Notify" message to at least one MC device 101 to receive the media stream transmitted by the first transmission participant device 100;

receiving, by transmission control server 102, a "Receive Media Request" message from the at least one MC device 101 to receive media stream from the first transmission participant device 100; sending, by the transmission control server 102, a "Receive Media Response (Grant)" message to the at least one MC device 101 to indicate a grant permission to receive the media stream from the first transmission participant device 100; receiving, by the transmission control server 102, a "Media Reception End Request" message to terminate the reception from the at least one MC device 101; sending, by the transmission control server 102, a "Media Reception End Response" to indicate the termination response of the media stream reception; determining, by the transmission control server 102, the at least one MC device 101 is not receiving the media stream based on expiry of predefined time duration of the timer T11; and entering, by the transmission control server 102, a "Reception Idle" state based on a Counter (C11) value that is defined as count of active receivers for the media stream.

In the embodiment of the disclosure, wherein the Counter C11 value is initialized to zero, wherein the counter C11 is associated with a transmitter synchronization source (SSRC) or UserId of the at least one MC device and a timer (T11) that is defined as a stream reception idle timer started with a time duration after Transmission control server 102 sends the "Media Transmission Notify" message to the at least one MC device 101.

In the embodiment of the disclosure, wherein the Counter C11 value is incremented by 1 for each of the "Receive Media Response (Grant)" sent to the MC device 101 and the Counter C11 value is decremented by one for each of the "Media Reception End Request" or the "Media Reception End Response" message received from MC device 101.

In the embodiment of the disclosure, wherein the timer (T11) is started with a time duration, based on at least one of: (a) the Counter (C11) value reaches a minimum limit; or (b) after sending Media Transmission Notify message to at least one MC device 101.

In the embodiment of the disclosure, wherein the timer (T11) is disabled by the transmission control server 102, based on at least one of: (a) at least one MC device 101 granted permission to receive the media stream from the transmission participant device 100 by sending the grant permission via a Receive Media Request (Grant) message; or (b) media transmission ended by Transmission control server 102 by sending a "Transmission end notify" message to the at least one MC device 101.

In the embodiment of the disclosure, wherein after the Timer T11 expiry, the MC server send an indication to terminate the transmission.

According to yet another embodiment of the disclosure, an MC server for handling media transmission in mission critical (MC) system is provided. The MC server comprises one or more processors configured to: receive a request from a first sender for transmitting a media stream to at least one receiver; send a notification to the at least one receiver to receive the media stream transmitted by the first sender; initiate a timer with a predefined time duration after sending the notification; determine that the notification to receive the media stream is rejected or not accepted by the at least one receiver within the predefined time duration of the timer; and send a transmission end request to the first sender to terminate the request for media stream transmission based on one of the rejection or non-acceptance of the reception of the media stream.

According to yet another embodiment of the disclosure, a MC device for handling media transmission in mission critical (MC) system is provided. The MC device comprises one or more processors configured to: receive a transmission end request from an MC server for terminating a media stream transmission; notify to a user associated with the MC device a reason for termination of media stream transmission, wherein the reason for ending the transmission is due to an absence of at least one receiver device for receiving the media stream; send a transmission end response to the MC server; and terminate transmitting the media stream to the MC server.

According to yet another embodiment of the disclosure, a transmission participant device for handling media transmission in mission critical (MC) system in plurality of MC devices 101 is provided. The transmission participant device comprises one or more processors configured to: receive a Transmission End Request from a Transmission Control Server 102; notify to a user associated with the transmission participant device, a media stream termination reason indicating client's permission to send a media is being revoked as result of an absence of at least one participant device to receive the media stream; send a Transmission End Response to the Transmission Control Server 102; and terminate sending of the media stream to the Transmission Control Server 102.

According to yet another embodiment of the disclosure, a Transmission Control Server for handling media transmission termination in mission critical (MC) system is provided. The Transmission Control Server comprises one or more processors configured to: send a Transmission End Request message to the transmitting MC device for terminating a transmission of a media stream when a timer (T11) that is defined as Stream Reception Idle timer expires; receive a Transmission End Response from the transmitting transmission participant device 100; and send a Transmit End Notify message to at least one media receiving client wherein the Transmit End Notify message indicates end of transmission from the transmission participant device 100.

According to another embodiment of the disclosure, a Transmission Control Server for handling media transmission in mission critical (MC) system is provided. The Transmission Control Server comprises one or more processor configured to: grant a permission to a first transmission participant device 100 to transmit a media stream to a plurality of MC devices 101; send a "Media Transmission Notify" message to at least one MC device 101 to receive the media stream transmitted by the first transmission participant device 100; receive a "Receive Media Request" message from the at least one MC device 101 to receive media stream from the first transmission participant device 100; send a "Receive Media Response (Grant)" message to the at least one MC device 101 to indicate a grant permission to receive the media stream from the first transmission participant device 100; receive a "Media Reception End Request" message to terminate the reception from the at least one MC device 101; send a "Media Reception End Response" to indicate the termination response of the media stream reception; determine the at least one MC device 101 is also not receiving the media stream based on expiry of predefined time duration of the timer T11; and enter a "Reception Idle" state based on a Counter (C11) value that is defined as count of active receivers for the media stream.

Unless otherwise defined, all technical and scientific terms used herein have the same meaning as commonly understood by one of ordinary skilled in the art to which this invention belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method performed by a mission critical (MC) server in an MC system, the method comprising:
   receiving, from a first MC device, a request message for transmitting a stream to at least one second MC device;
   as a response to the request message, transmitting, to the at least one second MC device, a notification message for receiving the stream transmitted by the first MC device, and starting a stream reception idle timer for the stream, wherein the stream reception idle timer is associated with a synchronization source (SSRC) or a user identifier (ID) of the first MC device;
   identifying that the stream reception idle timer has expired; and
   transmitting, to the first MC device, a request message for ending the transmission of the stream based on the identification.

2. The method of claim 1, further comprising:
   receiving, from the at least one second MC device, a request message for reception of the stream; and
   in case that reception of the stream is granted, stopping the stream reception idle timer and increasing a counter of active receivers for the stream by 1,
   wherein the counter is associated with the SSRC or the user ID of the first MC device.

3. The method of claim 1, further comprising:
   receiving, from the at least one second MC device, a request message or a response message for ending the reception of the stream;
   decreasing a counter of active receivers for the stream by 1, in case that the counter has not reached a lower limit value; and
   starting the stream reception idle timer, in case that the counter has reached the lower limit value.

4. The method of claim 1, further comprising:
   transmitting, to the at least one second MC device, a notification message for ending the transmission of the stream; and
   stopping the stream reception idle timer.

5. The method of claim 1, further comprising:
   receiving, from the first MC device, a response message for ending the transmission of the stream,
   wherein the request message for ending the transmission of the stream includes a reject cause value indicating that a reason for permission of the first MC device to transmit the stream is being revoked is no participant to receive the stream.

6. A method performed by a first mission critical (MC) device in a MC system, the method comprising:
   transmitting, to an MC server, a request message for transmitting a stream to at least one second MC device, the request message triggering a stream reception idle timer for the stream to start, wherein the stream reception idle timer is associated with a synchronization source (SSRC) or a user identifier (ID) of the first MC device;
   in case that the first MC device is granted permission to transmit the stream, transmitting, to the at least one second MC device, the stream;
   in case that the stream reception idle timer has expired, receiving, from the MC server, a request message for ending the transmission of the stream; and
   transmitting, to the MC server, a response message for ending the transmission of the stream.

7. The method of claim 6, wherein:
   in case that reception of the stream is granted, a counter of active receivers for the stream is increased, and the stream reception idle timer is stopped,
   in case that the counter has reached a lower limit value, the stream reception idle timer is started,
   the counter is associated with the SSRC or the user ID of the first MC device, and
   the request message for ending the transmission of the stream includes a reject cause value indicating that a reason for permission of the first MC device to transmit the stream is being revoked is no participant to receive the stream.

8. A mission critical (MC) server in an MC system, the MC server comprising:
   a transceiver; and
   a controller configured to:
      receive, from a first MC device via the transceiver, a request message for transmitting a stream to at least one second MC device,
      as a response to the request message, transmit, to the at least one second MC device via the transceiver, a notification message for receiving the stream transmitted by the first MC device and start a stream reception idle timer for the stream, wherein the stream reception idle timer is associated with a synchronization source (SSRC) or a user identifier (ID) of the first MC device,
      identify that the stream reception idle timer has expired, and
      transmit, to the first MC device via the transceiver, a request message for ending the transmission of the stream based on the identification.

9. The MC server of claim 8, wherein the controller is further configured to:
   receive, from the at least one second MC device via the transceiver, a request message for reception of the stream, and
   in case that reception of the stream is granted, stop the stream reception idle timer and increase a counter of active receivers for the stream by 1,
   wherein the counter is associated with the SSRC or the user ID of the first MC device.

10. The MC server of claim 8, wherein the controller is further configured to:
   receive, from the at least one second MC device via the transceiver, a request message or a response message for ending the reception of the stream,
   decrease a counter of active receivers for the stream by 1, in case that the counter has not reached a lower limit value, and
   start the stream reception idle timer, in case that the counter has reached the lower limit value.

11. The MC server of claim 8, wherein the controller is further configured to:

transmit, to the at least one second MC device via the transceiver, a notification message for ending the transmission of the stream, and stop the stream reception idle timer.

12. The MC server of claim 8, wherein the controller is further configured to:

receive, from the first MC device via the transceiver, a response message for ending the transmission of the stream.

13. The MC server of claim 8, wherein the request message for ending the transmission of the stream includes a reject cause value indicating that a reason for permission of the first MC device to transmit the stream is being revoked is no participant to receive the stream.

14. A first mission critical (MC) device in an MC system, the first MC device comprising:

a transceiver; and a controller configured to:

transmit, to an MC server via the transceiver, a request message for transmitting a stream to at least one second MC device, the request message triggering a stream reception idle timer for the stream to start, wherein the stream reception idle timer is associated with a synchronization source (SSRC) or a user identifier (ID) of the first MC device, in case that the first MC device is granted permission to transmit the stream, transmit, to the at least one second MC device via the transceiver, the stream, in case that the stream reception idle timer has expired, receive, from the MC server via the transceiver, a request message for ending the transmission of the stream, and transmit, to the MC server via the transceiver, a response message for ending the transmission of the stream.

15. The first MC device of claim 14, wherein:

in case that reception of the stream is granted, a counter of active receivers for the stream is increased, and the stream reception idle timer is stopped, in case that the counter has reached a lower limit value, the stream reception idle timer is started, the counter is associated with the SSRC or the user ID of the first MC device, and the request message for ending the transmission of the stream includes a reject cause value indicating that a reason for permission of the first MC device to transmit the stream is being revoked is no participant to receive the stream.

\* \* \* \* \*